(12) United States Patent
Krauska et al.

(10) Patent No.: US 6,363,556 B1
(45) Date of Patent: Apr. 2, 2002

(54) LINKAGE FOR AN ARTICULATING BED

(75) Inventors: Bernard J. Krauska, Waukesha; John L. Edgerton, Jr., Stevens Point, both of WI (US)

(73) Assignee: Sunrise Medical HHG Inc., Longmont, CO (US)

(*) Notice: Subject to any disclaimer, the term of this patent is extended or adjusted under 35 U.S.C. 154(b) by 0 days.

(21) Appl. No.: 09/480,305

(22) Filed: Jan. 10, 2000

Related U.S. Application Data

(60) Provisional application No. 60/052,131, filed on Jul. 10, 1997.

(51) Int. Cl.[7] .................................................. A47B 7/02
(52) U.S. Cl. ........................ 5/618; 5/613; 5/616; 5/617
(58) Field of Search ............................ 5/613, 616, 617, 5/618

(56) References Cited

U.S. PATENT DOCUMENTS

| | | | |
|---|---|---|---|
| 2,617,118 A | * 11/1952 | Lorenz ........................... | 5/618 |
| 3,036,314 A | * 5/1962 | Wetzler ........................... | 5/618 |
| 3,222,693 A | 12/1965 | Pruim et al. | |
| 3,398,411 A | * 8/1968 | Douglass ........................ | 5/618 |
| 3,965,500 A | * 6/1976 | Stein, Jr. ....................... | 5/618 |
| 4,097,940 A | * 7/1978 | Tekulve et al. ................. | 5/616 |
| 4,225,988 A | * 10/1980 | Cary et al. .................... | 5/618 X |
| 5,608,932 A | 3/1997 | Hasegawa | |
| 5,706,536 A | 1/1998 | Krauska | |
| 6,161,236 A | * 12/2000 | Carroll .......................... | 5/618 |
| 6,230,346 B1 | * 5/2001 | Branson et al. ................ | 5/618 |

* cited by examiner

Primary Examiner—Lynne H. Browne
Assistant Examiner—James M. Hewitt
(74) Attorney, Agent, or Firm—MacMillan, Sobanski & Todd, LLC

(57) ABSTRACT

A linkage for an articulating bed comprises a first latch arm which extends from the knee section of an articulating bed. A latch bar is connected between the first latch arm and the back section of the articulating bed. The latch bar is displaceable between a first position and a second position. The latch arm is engageable with the latch bar when the latch bar is in the first position to maintain movement of the back section independent relative to the knee section. The latch arm is engageable with the latch bar when the latch bar is in the second position to interconnect the back section and the knee section.

16 Claims, 29 Drawing Sheets

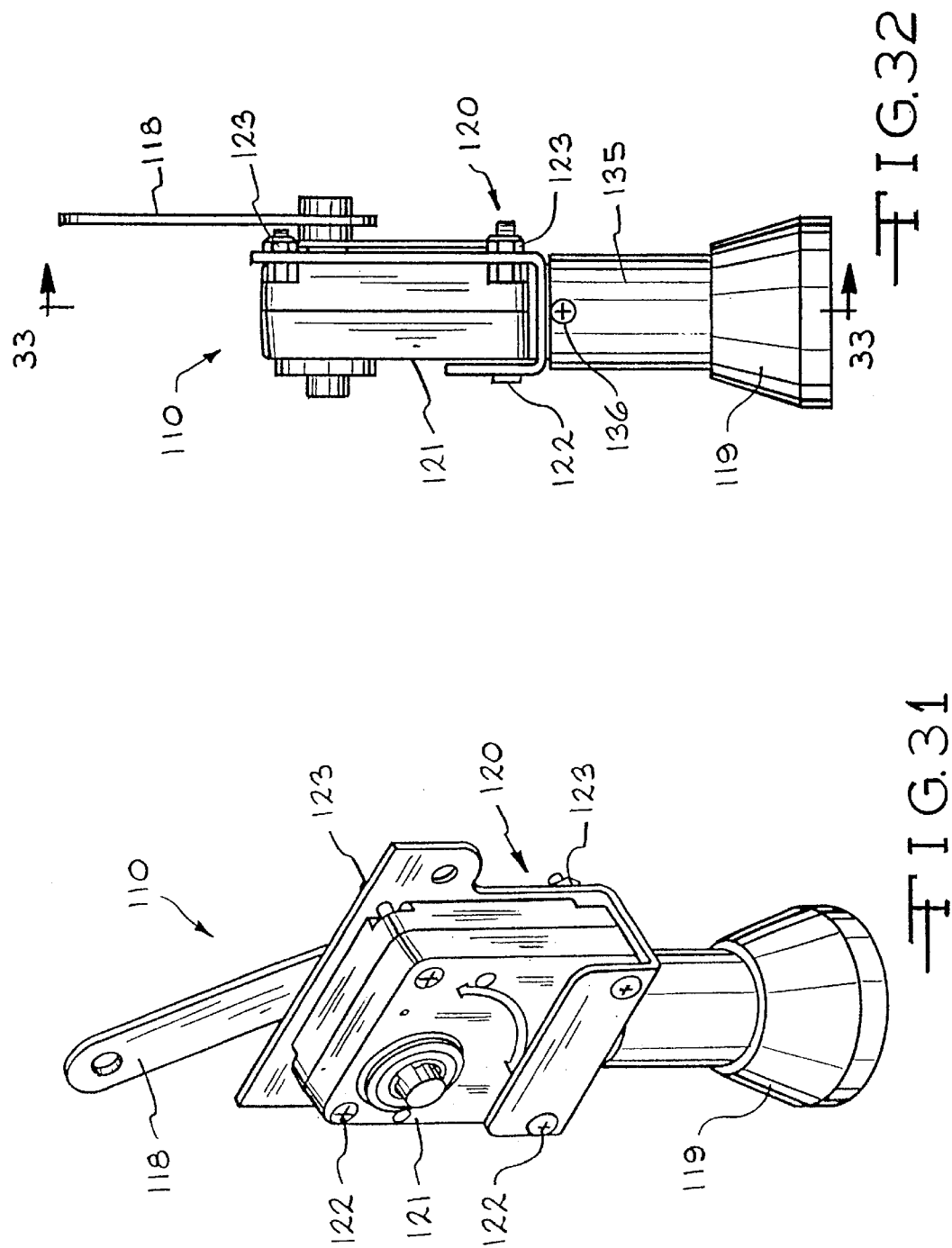

LINKAGE FOR AN ARTICULATING BED

CROSS-REFERENCE TO RELATED APPLICATIONS

This application claims the benefit of International Patent Application No. PCT/US98/14311, filed on Jul. 9, 1998, which claims the benefit of U.S. Provisional Patent No. 60/052,131, filed on Jul. 10, 1997.

BACKGROUND OF THE INVENTION

The present invention relates in general to healthcare furniture and more particularly to convalescent bedding. Most particularly, this invention relates to a linkage for interconnecting the back section and the knee section of an articulating bed.

Adjustable or articulating beds are commonly used in the health care field. A typical bed includes a base and a mattress frame or support which is divided into a head or back section, a seat section and a leg or foot section. The mattress frame sections are pivotally interconnected and have a range of adjustment. The sections are normally movable from a flat, patient resting position to a seated position. The sections of the bed can be pivoted by motor drives, hand operated cranks, the patient's weight or other similar arrangements. In addition, most articulating mattress frames may be tilted to raise either the head or feet of a patient lying on the bed.

Examples of multi-position adjustable beds may be found in U.S. Pat. No. 5,105,486, issued to Warren J. Peterson and U.S. Pat. No. 5,245,718, issued to Bernard J. Krauska. The bed disclosed in U.S. Pat. No. 5,105,486 includes a mattress frame having a head section, a seat or intermediate section and a foot section, which are pivotally interconnected.

In the vast majority of instances, the full range of adjustment available with beds heretofore provided is not used. The most common mode of operation is to raise the mattress surface or sleeping surface from a flat configuration to a raised position when patient care is being administered. Raising the sleeping surface reduces back strain on the attendant while changing dressings, bandages, clothes and performing tests, and other like operations. When a patient is left unattended, the bed is typically placed in a lowered position for patient comfort and to reduce possible injury in the event the patient attempts to leave the bed. When the mattress sections are being articulated, typically the back and/or head sections are the most frequently used mode. Back section elevation is used to increase the comfort of the patient while eating, reading, conversing, and watching television or the like. In addition, a patient will typically use the back section as an arm support while exiting the bed.

Prior articulating beds generally have rather limited adjustability of the mattress sections, and typically require a complicated mechanism to provide a tilt function. In addition, prior beds utilizing pivoting links for a raising and lowering function commonly have an appreciable amount of side movement during the raising or lowering operation due to the relatively small pivot radius provided by the linkage.

A need therefore exists for an adjustable or articulating bed of reduced complexity which meets the most common operation modes or requirements and which provides a simple and straightforward operation.

SUMMARY OF THE INVENTION

The present invention is directed towards a linkage for an articulating bed. The linkage comprises a first latch arm which extends from the knee section of an articulating bed. A latch bar is connected between the first latch arm and the back section of the articulating bed. The latch bar is displaceable between a first position and a second position. The latch arm is engageable with the latch bar when the latch bar is in the first position to maintain movement of the back section independent relative to the knee section. The latch arm is engageable with the latch bar when the latch bar is in the second position to interconnect the back section and the knee section.

Various objects and advantages of this invention will become apparent to those skilled in the art from the following detailed description of the preferred embodiment, when read in light of the accompanying drawings.

BRIEF DESCRIPTION OF THE DRAWINGS

FIG. 31 is a perspective view of the brake assembly of the articulating bed.

FIG. 32 is a side elevational view of the brake assembly shown in FIG. 31.

DETAILED DESCRIPTION OF PREFERRED EMBODIMENT

Figure 1:
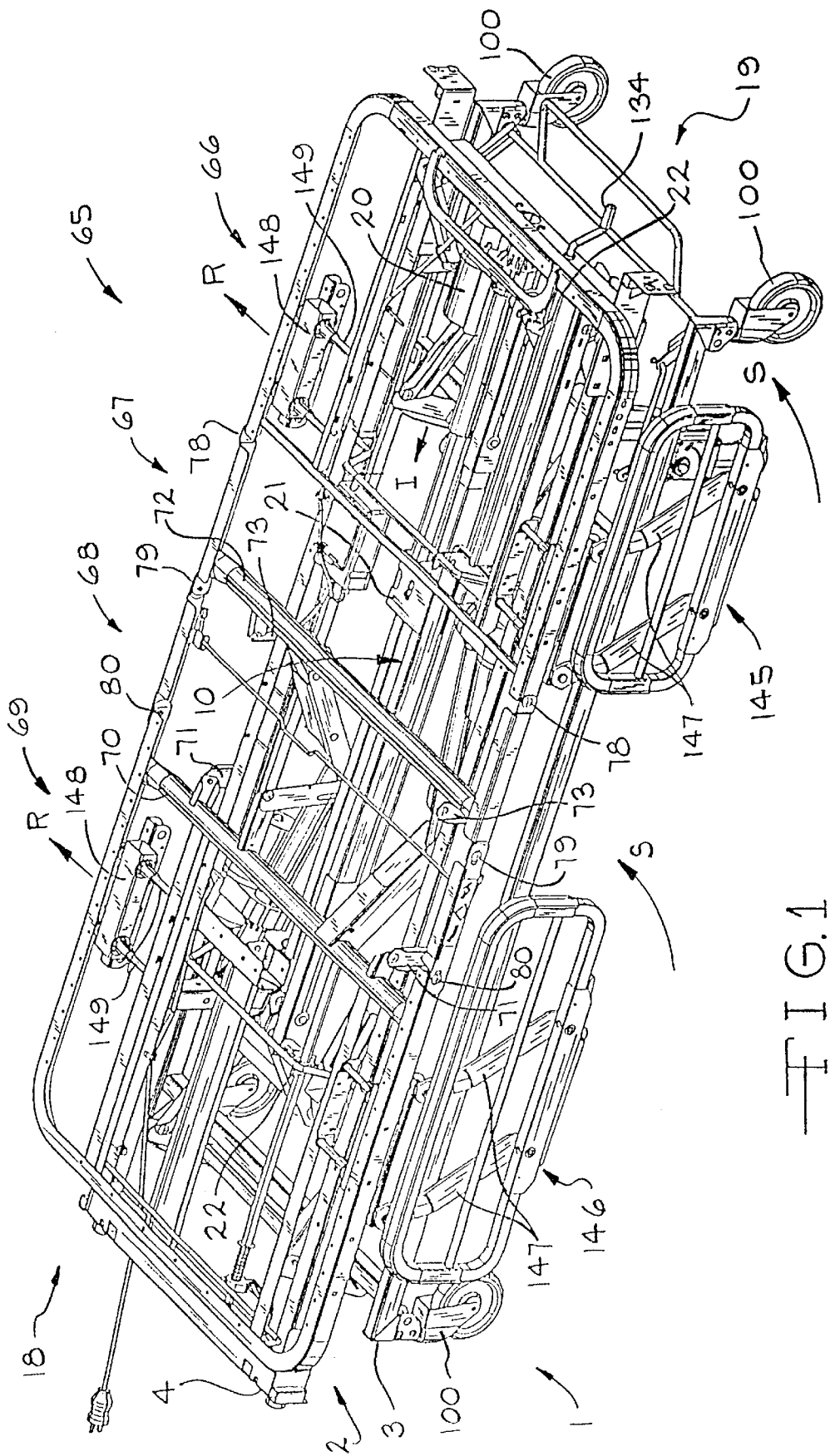
FIG. 1 is a perspective view of an articulating bed embodying the present invention.

For purposes of description herein, the terms "upper", "lower", "head", "foot", "vertical", "horizontal", and derivatives of these terms shall relate to the invention as oriented in FIG. 1. However, it is to be understood that the invention may assume various alternative orientations and step sequences. It is also to be understood that the specific devices and processes illustrated in the attached drawings and described in the following specification are simply exemplary embodiments of the inventive concepts defined in the appended claims. For example, the devices illustrated and described include a mattress frame that raises, lowers and tilts, and movable head and knee sections. However, it is to be understood that the present invention may be applied to other movable bed sections as well. Hence, specific dimensions and other physical characteristics relating to the embodiments disclosed herein are not to be considered as limiting.

Figure 2:
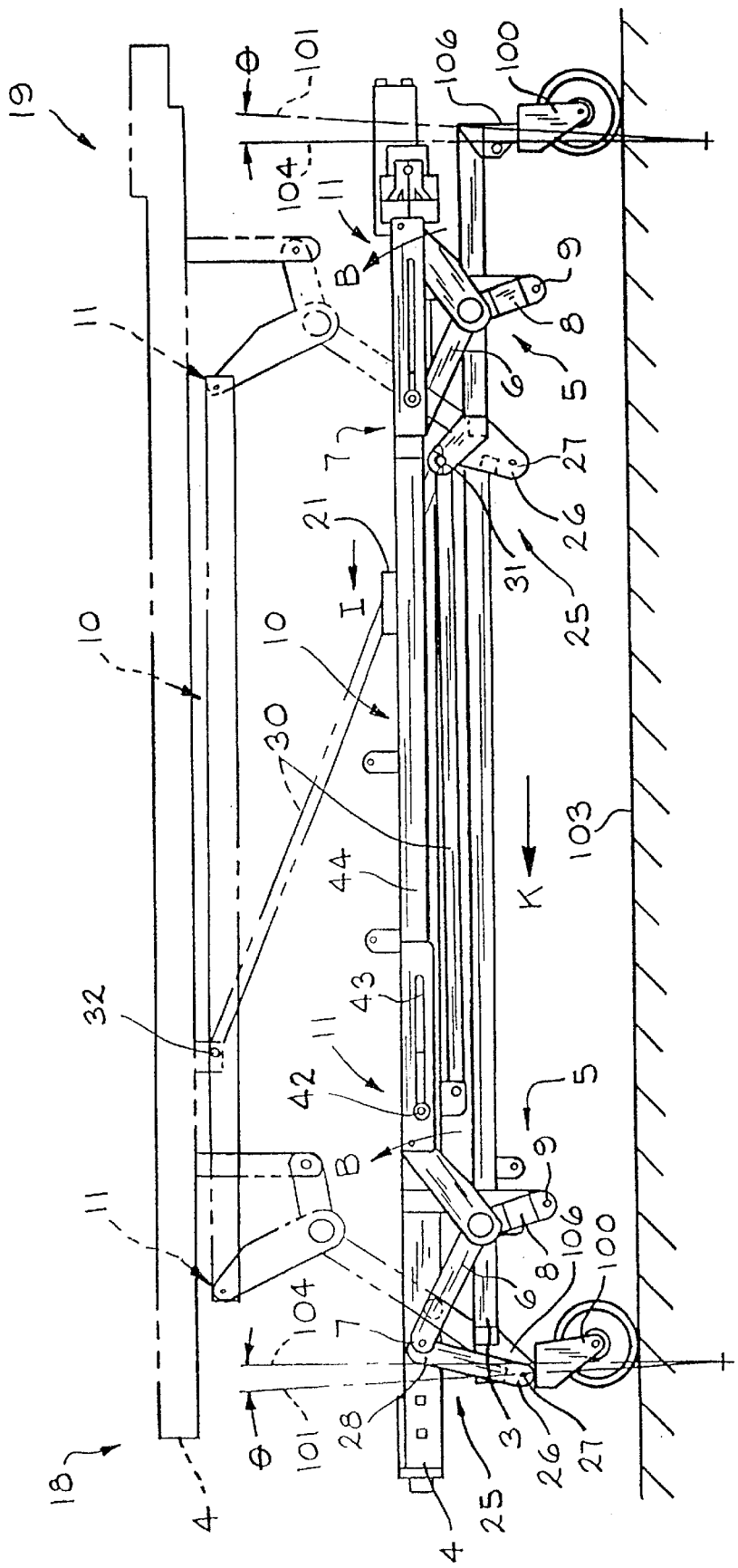
FIG. 2 is a side elevational view of the articulating bed with a mattress frame in a lowered position, and further showing the mattress frame in a raised position shown in broken lines.
Figure 4:
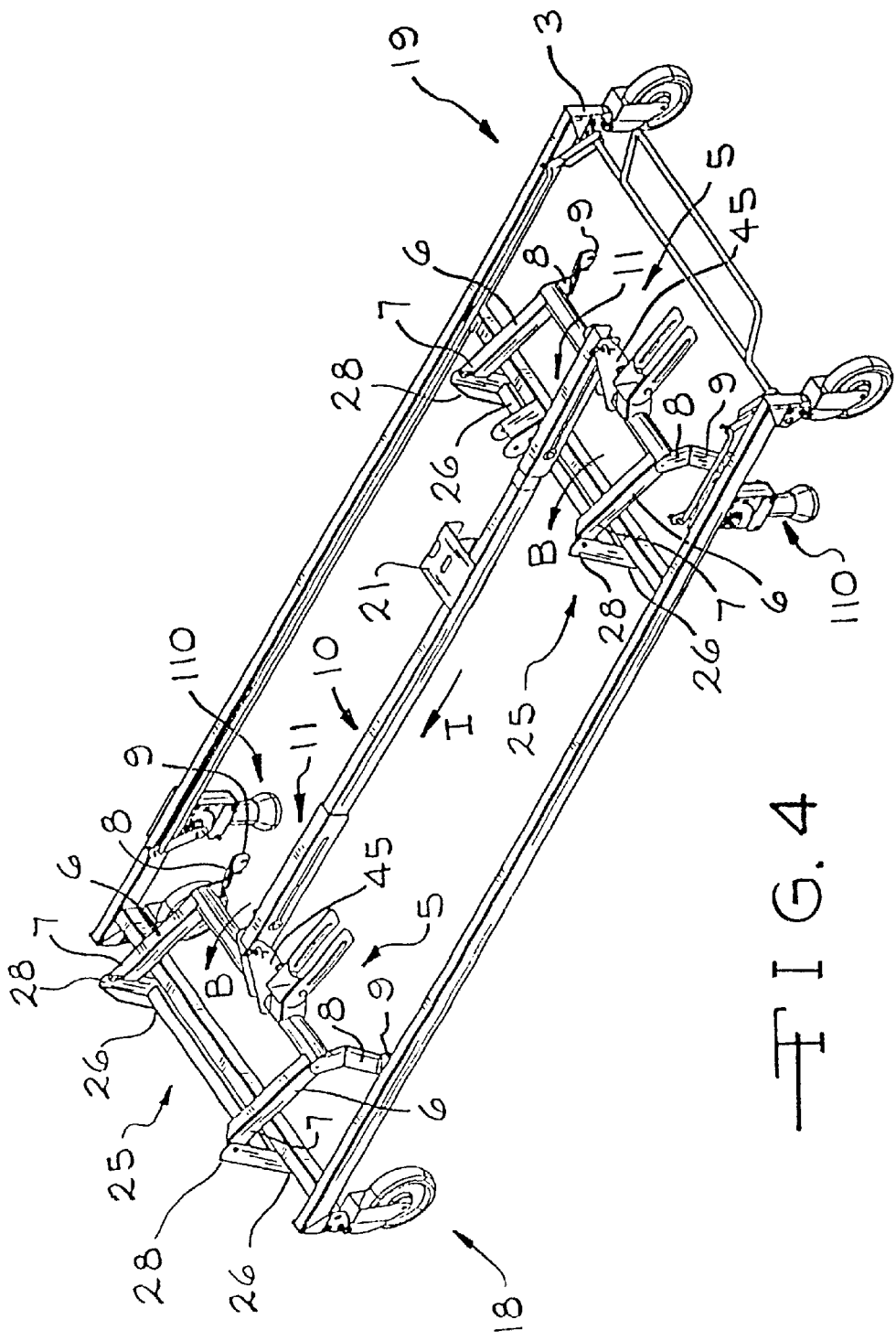
FIG. 4 is a perspective view of the base frame and the linkage assembly of the articulating bed.
Figure 5:
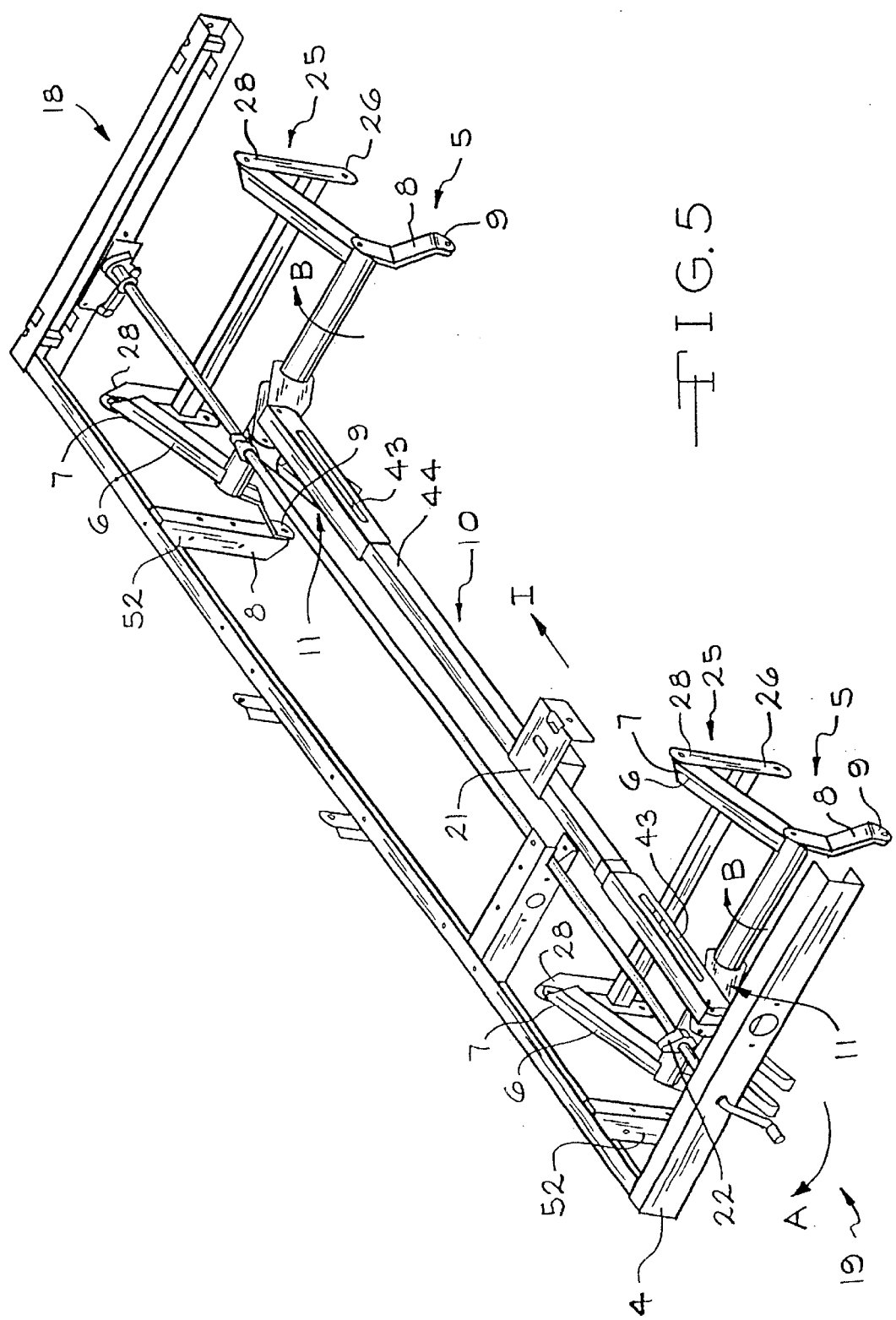
FIG. 5 is a partial perspective view of the mattress frame and the linkage assembly for raising and lowering the mattress frame, and a lock member for selecting the tilting function.

Continuing with reference to FIG. 1, there is shown an articulating bed for hospitals and the like, generally designated as reference number 1. In the illustrated example, the bed 1 has a frame assembly 2, which includes a base frame 3 for supporting a mattress frame 4. As shown in FIGS. 2–5, a pair of lever members 5 have a first pair of extensions 6 with the ends 7. The ends 7 of the first pair of extensions 6 are operably and pivotally attached to the base frame 3 (as illustrated in FIGS. 2 and 4). The lever members 5 also include a second pair of extensions 8 with the ends 9. The ends 9 of the second pair of extensions 8 are pivotally attached to the mattress frame 4 (as illustrated in FIGS. 2 and 5). A drag link assembly 10 includes a telescoping end portion 11 that is movable between an extended position and a retracted position. One of the lever members 5 is pivotally attached to the telescoping end portion 11 by a pin 16 and retainer clip 17 (both of which are clearly shown in FIG. 3). As shown in FIG. 1, an extendable actuator 20 is mounted to the mattress frame 4 and connected to the drag link 10 at bracket 21. Upon moving the actuator 20 in the direction of the arrow "I" (shown in FIG. 3), the lever members 5 rotate in the direction of the arrow "B" to move or raise the mattress frame 4, as illustrated in FIG. 2. Returning with reference to FIG. 5, a lock member 22 is operably attached to the mattress frame 4 and is selectively movable between a locked position and an unlocked position. The lock member 22 engages a lever member 5 when in the locked position to prevent rotation of the lever member 5 upon retraction of the actuator 20. For example, when the lock member 22 is engaged with the lever members 5 at the foot end 19 of the bed, the drag link 10 is permitted to rotate the lever member 5 at the head end 18 of the bed to lower the mattress frame 4 at the foot end 19 of the bed while maintaining the mattress frame 4 at substantially the same height at the head end 18 of the bed.

Once again, referring to FIG. 4, the lever members 5 are shown operably pivotally attached to the base frame 3 by idler links 25. The lower ends 26 of idler links 25 are pivotally connected to the base frame 3 in a spaced-apart relationship by pins 27 (clearly shown in FIG. 3). The upper ends 28 of idler links 25 are pivotally attached to the first pair of extensions 6 of the lever members 5 by pins 27 (also clearly shown in FIG. 3). Now, referring back to FIG. 2, a stabilizer link 30 is shown pivotally connected at a first end 31 to the base frame 3 adjacent one end of the frame assembly. The stabilizer link 30 is also pivotally connected to the mattress frame 4 adjacent the other end 32 of the frame assembly to guide the mattress frame 4 when raised by the actuator 20. The use of the stabilizer link 30 and idler links 25 minimize the amount of horizontal movement of the mattress frame 4 during the raising and lowering of the mattress frame 4.

Figure 6:
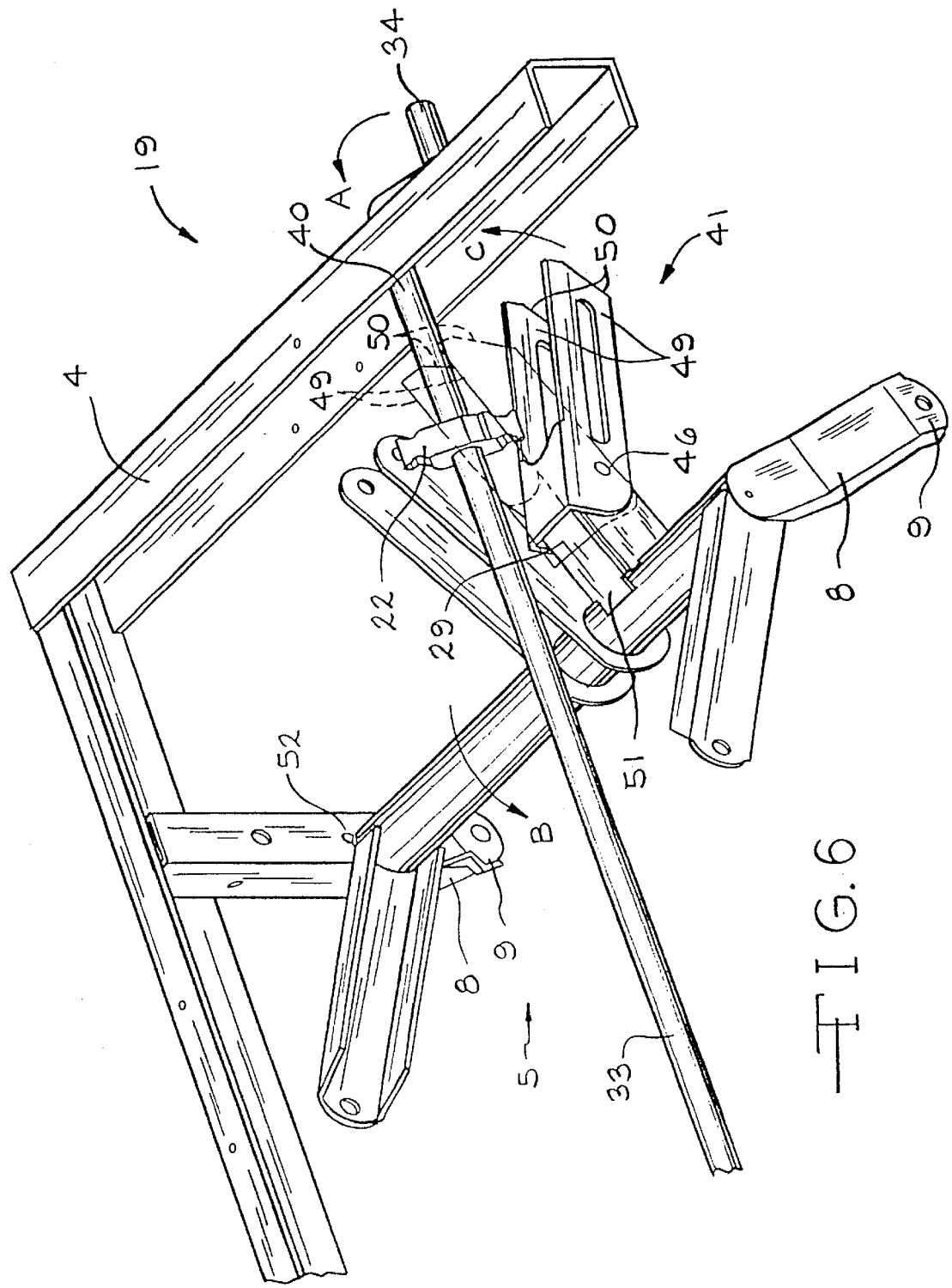
FIG. 6 is an enlarged partial perspective view showing lever stop portions of the linkage assembly and the locking member.
Figure 11:
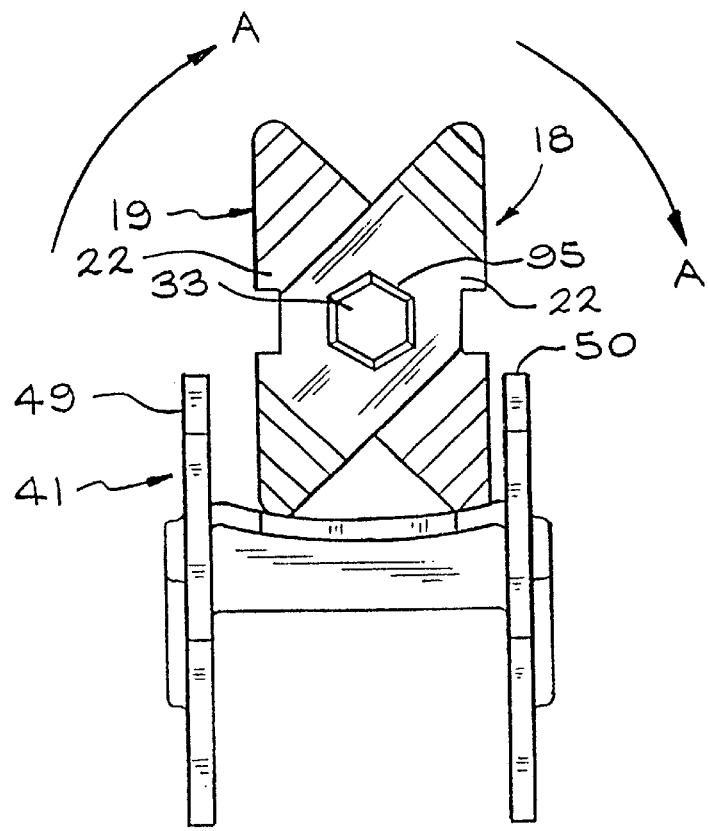
FIG. 11 is an enlarged end view of the two lock members and a lever stop of the articulating bed.

As set forth above, the head or foot ends 18, 19 of the bed may be lowered by selectively engaging the lock member 22 with the lever members 5. As shown in FIG. 6, the lock member 22 is engageable with a lever stop 41 to prevent rotation of the lever member 5 adjacent the head or foot ends 18, 19 of the bed, depending on which tilt angle is desired. The lock members 22 are mounted on an elongate hex shaft 33 that is pivotally mounted to the mattress frame 4 so as to permit the lock member 22 to be rotated relative to the mattress frame 4. A hand crank 34 is attached to the hex shaft 33 by sleeve 40 (clearly shown in FIG. 9). With the mattress frame 4 in the raised position, the handle 34 is rotated clockwise in the direction of the arrow "A". Retracting the actuator 20 (shown in FIG. 1) then lowers the mattress frame 4. As illustrated in FIG. 4, this moves the drag link 10 in a direction opposite the direction of the arrow "I", rotating the lever members 5 in a direction opposite the direction of arrow "B". As the lever members 5 rotate, the lock member 22 adjacent the foot end 19 of the bed will engage the stop surface 50 of lever stop 41. This prevents further rotation of the lever member 5 at the foot end 19 in the downward direction, that is to say, in a direction opposite of the arrow "B". Because the lever member 5 adjacent the foot end 19 cannot rotate to lower the mattress frame 4, the mattress frame 4 at the foot end 19 remains at a relatively constant height. However, because the lever member 5 adjacent the head end 18 of the bed continues to rotate downward in a direction opposite the direction of the arrow "B", the head end 18 of the mattress frame 4 will move to the lower position. This position is commonly referred to as a "Trendelenburg" position. In the Trendelenburg position, the mattress frame 4 is tilted so that the foot end 19 of the bed is elevated above the head end of the bed. When the lock members 22 are in a neutral or center position, the lock members 22 pass between the arms 49 of the lever stop 41 (as illustrated in FIG. 11), and therefore do not prevent rotation of the lever members 5. If the hand crank 34 is turned in a direction opposite the direction of the arrow "A", the lock member 22 adjacent the head end 18 of the bed engages the lever stop 41. In this position, the foot end 19 of the bed is lowered while the head end 18 is retained at substantially the same height, thereby tilting the bed in a position commonly referred to as a reverse "Trendelenburg" position. In the Trendelenburg position, the mattress frame 4 is tilted so that the head end 18 of the bed is elevated above the foot end 18 of the bed.

Figure 7:
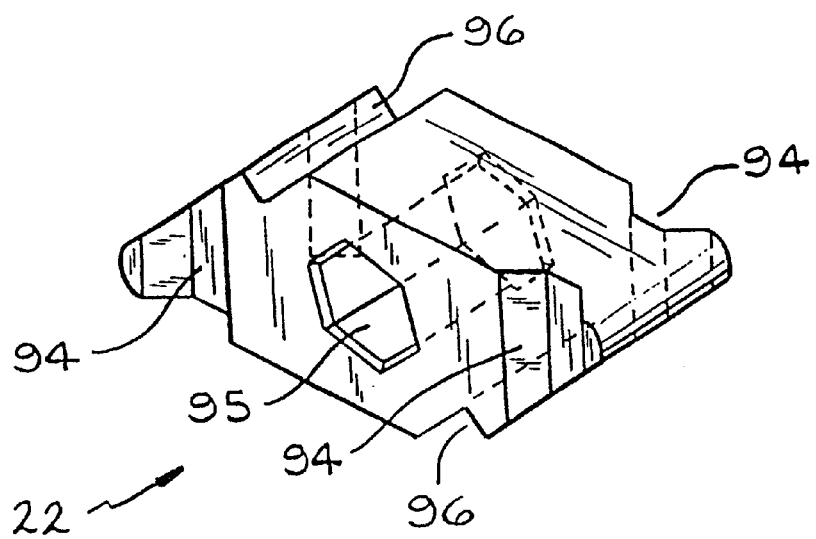
FIG. 7 is an enlarged perspective view of the lock member.
Figure 8:
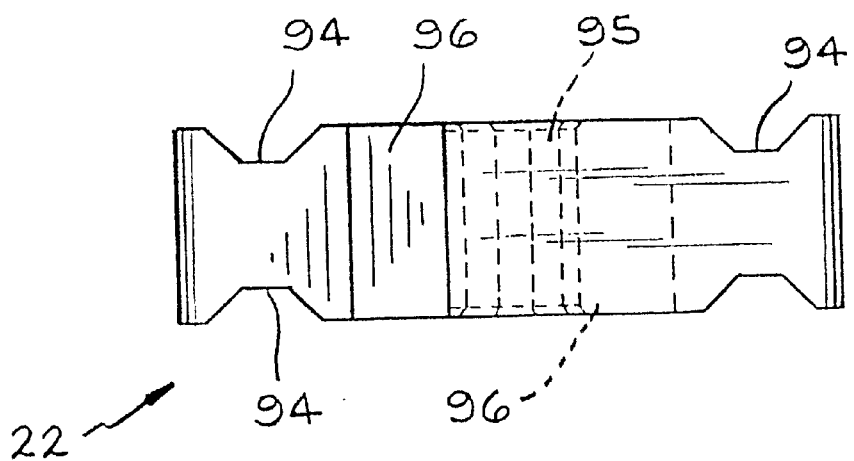
FIG. 8 is an enlarged top plan view of the lock member shown in FIG. 7.

As shown in FIGS. 7 and 8, the lock member 22 includes a hexagonal aperture 95, which corresponds to the outer surface of the hexagonal rod 33 (shown in FIG. 6). The locking member 22 includes four chamfered locking portions 94. The chamfered locking portions 94 engage the stop surfaces 50 of the lever stop 41 (clearly shown in FIGS. 11 and 12), and prevent rotation of the crank 34 (shown in FIG. 6) out of the engaged position.

Figure 9:
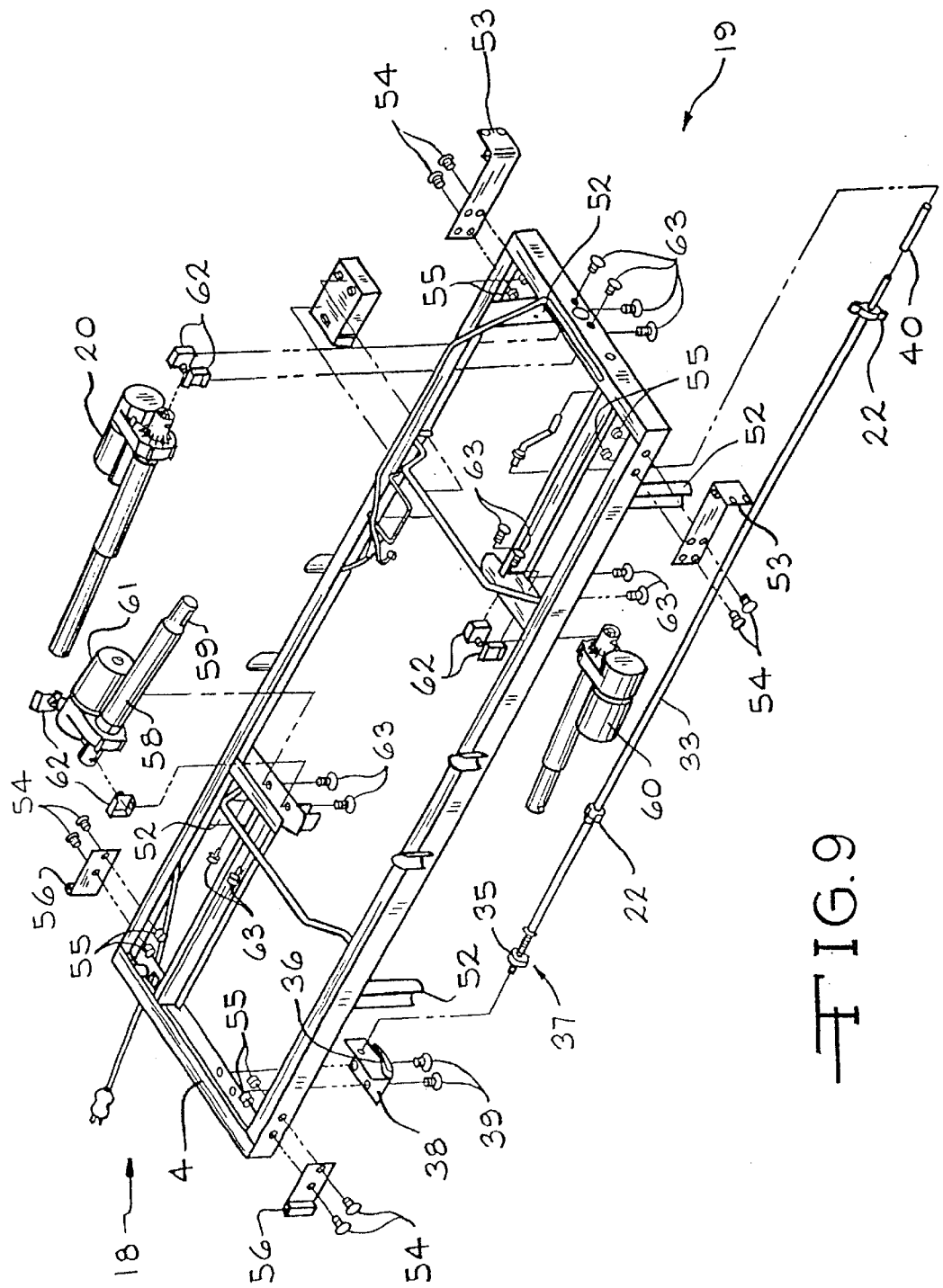
FIG. 9 is an exploded perspective view of the mattress frame, showing the mounting of extendable actuators.
Figure 10:
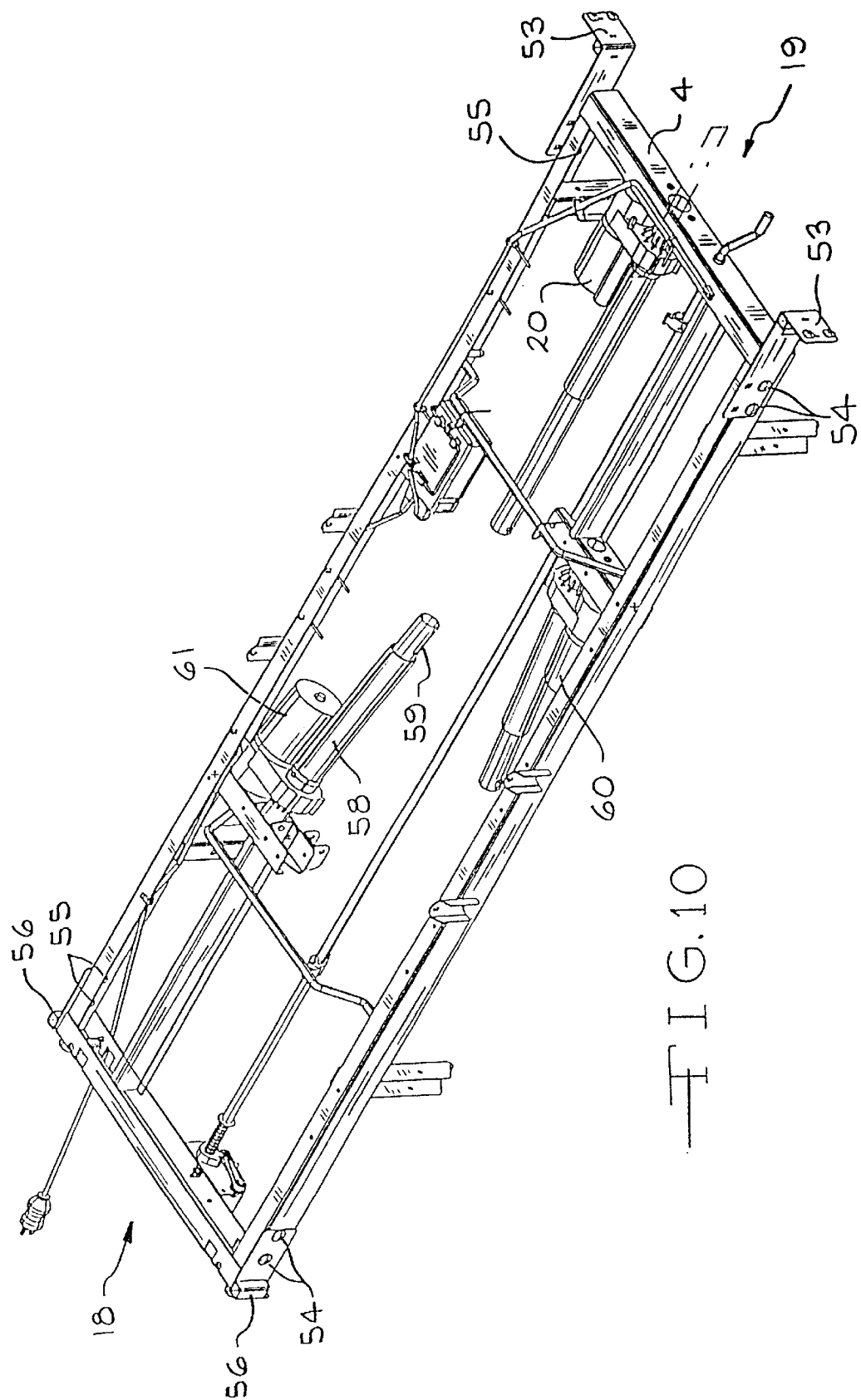
FIG. 10 is a perspective view of the mattress frame showing the extendable actuators in an assembled condition.

As shown in FIGS. 9 and 10, a cam 35 is attached to the end of the tube 33 opposite the handle 34. The cam 35 includes three indents 37 corresponding to the neutral center position and the two tilting modes. A cam follower 36 includes a spring (not shown) that biases the follower 36 into the indents 37 of the cam 35, thereby providing a detent function that retains the crank 34 and lock members 22 in the selected position. The cam follower 36 is rotatably mounted to a bracket 38, which is mounted to the mattress frame 4 by screws 39.

Referring back to FIG. 3, each drag link assembly 10 shown includes a telescoping end portion 11 that is slidably mounted at each end. A pin 42 is received in an aperture (not shown) in the main tube 44 and slots 43 in the end portions 11. This allows the end portion 11 to slide axially in a telescoping manner along the main tube 44 during tilting of the mattress frame 4. The end portions 11 are pivotally connected by pins 16 and retainer clips 17 to the extensions 45 of the lever members 5. Each lever stop 41 includes a pair of generally flat arms 49 extending away from the lever member 5 forming a fork, with stop surfaces 50 at the ends of the flat arms 49, as clearly shown in FIG. 6. The lever stop 41 is pivotally mounted to a stop extension 51 by a pin 46 and a retainer clip 47 (shown in FIG. 3). A spring 48 is retained on the pin 46 and biases the lever stop 41 upwardly in the direction of the arrow "C", also shown in FIG. 6. The moment generated by the spring 48 causes the lever stop 41 to rotate upwardly to the position shown in "phantom" lines in FIG. 6. In this position, the inner surface 29 of the lever stop 41 contacts the stop extension 51 to prevent further upward rotation.

Figure 12:
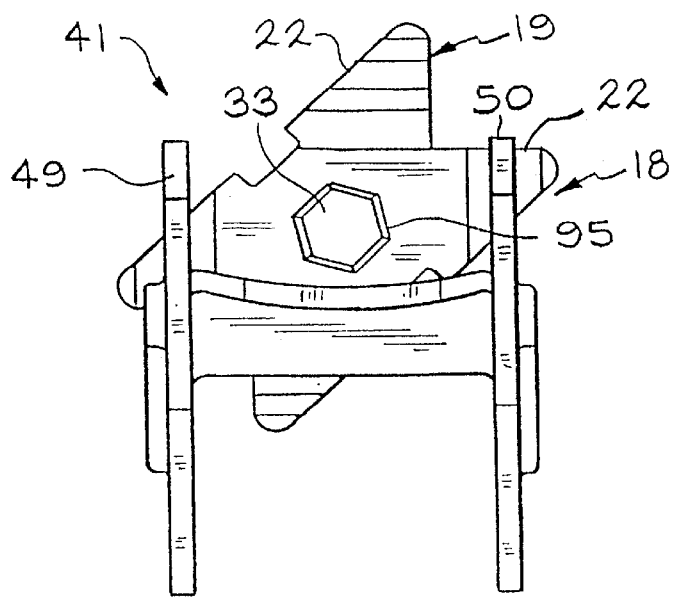
FIG. 12 is an enlarged end view of the two lock members and the lever stop shown in FIG. 11, further showing the lock member at a foot end of the bed rotated to engage the lever stop at the foot end of the bed.
Figure 13:
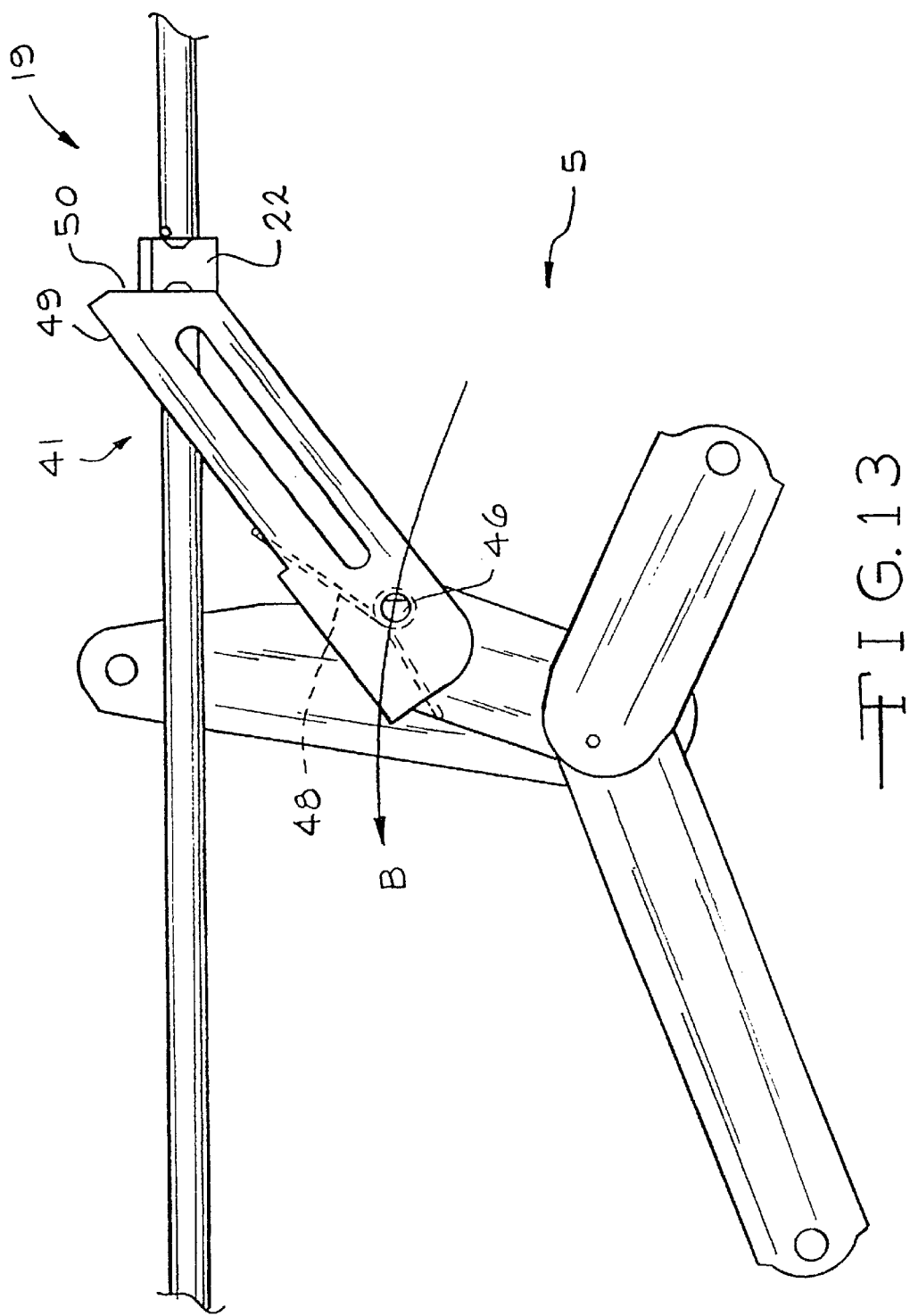
FIG. 13 is an enlarged side elevational view of the lock member engaging the lever stop.
Figure 14:
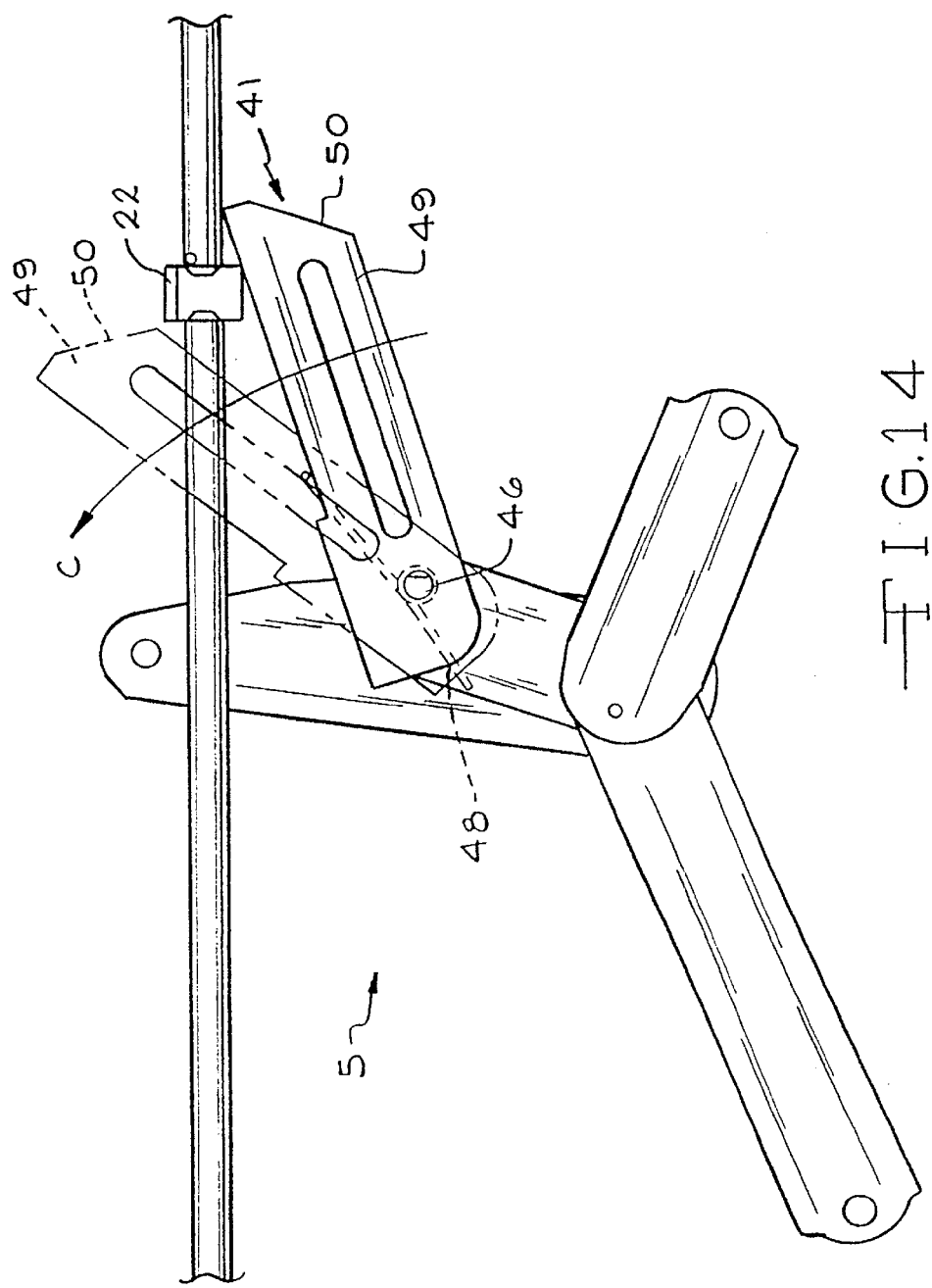
FIG. 14 is a side elevational view of the lever stop engaging the lock member upon elevating the bed.

Tilting the bed requires that the mattress frame 4 first be raised to the fully upward position to elevate the lock member 22 above the lever stop 41. Subsequently, the crank 34 is rotated from a neutral position clockwise or counterclockwise to prevent either the head or foot end 18, 19 (shown in FIG. 2) from lowering. For example, if the crank 34 is rotated from the neutral position clockwise in the direction of the arrow "A" shown in FIGS. 5 and 6, the lock member 22 at the foot end 19 of the bed will rotate clockwise in the same direction, as shown in FIG. 11. Upon rotating the crank 34 forty-five degrees, the cam follower 36 (shown in FIG. 9) will be biased into one of the indents 37 of the cam 35 to retain the lock members 22 in a selected position, as shown in FIG. 12. This will retain the lock members 22 in a selected position. In this position, the chamfered locking portions 94 of the lock member 22 at the foot end 19 of the bed align with the lever stop 41 at the foot end 19 of the bed. Upon lowering the mattress frame 4, the lever members 5 begin to rotate in a direction opposite the direction of the arrow "B" until the lever stop 41 adjacent the foot end 19 of the bed contacts the lock member 22, as illustrated in FIGS. 12 and 13. This prevents rotation of the lever member 5 at the foot end 19 of the bed. The lever member 5 adjacent the head end 18 of the bed will continue to rotate in a direction opposite the direction of the arrow "B". This will lower the mattress frame 4 at the head end 18 of the bed. If the mattress frame 4 is in a fully lowered position at both the head and foot ends 18, 19 and the crank 34 is turned clockwise or counterclockwise to a position to engage either of the lock members 22, and the mattress frame 4 is then moved upwardly, the stop 22 will contact the lever stop 41. However, because the lever stop 41 is pivotally mounted about the pin 46, it will pivot downwardly in the direction opposite the arrow "C", as shown in FIG. 14, thereby allowing the mattress frame 4 to continue moving upwardly. If the mattress frame 4 continues to move upward, the lever stop 41 may slide past the lock member 22 and snap upwardly in the direction of the arrow "C" due to the moment generated by the spring 48, as shown in phantom in FIG. 14. Alternatively, upon rotating the crank 34 to the neutral position, the lock member 22 will slip between the flat arms 49 of the lever stop 41 to permit the lever stop 41 to snap upwardly in the direction of the arrow "C".

Once again, with reference to FIG. 5, the mattress frame 4 includes a pair of downward extensions 52 located adjacent the head end 18 of the bed, and another pair of downward extensions 52 located near the foot end 19 of the bed. The ends 9 of the lever members 5 are pivotally attached to the downward extensions 52 (as is clearly shown in FIG. 5). As shown in FIGS. 9 and 10, a pair of headboard brackets 56 for mounting of a headboard (not shown) are attached near the head end 18 of the mattress frame 4 by bolts 54 and nuts 55. Similarly, a pair of footboard brackets 53 for mounting of a footboard 165 (shown in FIGS. 24–26) are attached to the mattress frame 4 adjacent the foot end 19 of the bed. Continuing with reference to FIGS. 9 and 10, in addition to the first extendable actuator 20 which acts on the drag link assembly 10 (shown in FIGS. 1–5) to raise, lower and tilt the mattress frame 4, a back section actuator 60 and a knee section actuator 61 are also mounted to the mattress frame 4 (as clearly shown in FIG. 10). Brackets 62 pivotally mount the actuators to the mattress frame 4. Fasteners 63 retain the brackets 62. Each of the actuators includes an electric motor and gear arrangement for extension of the actuator.

Figure 15:
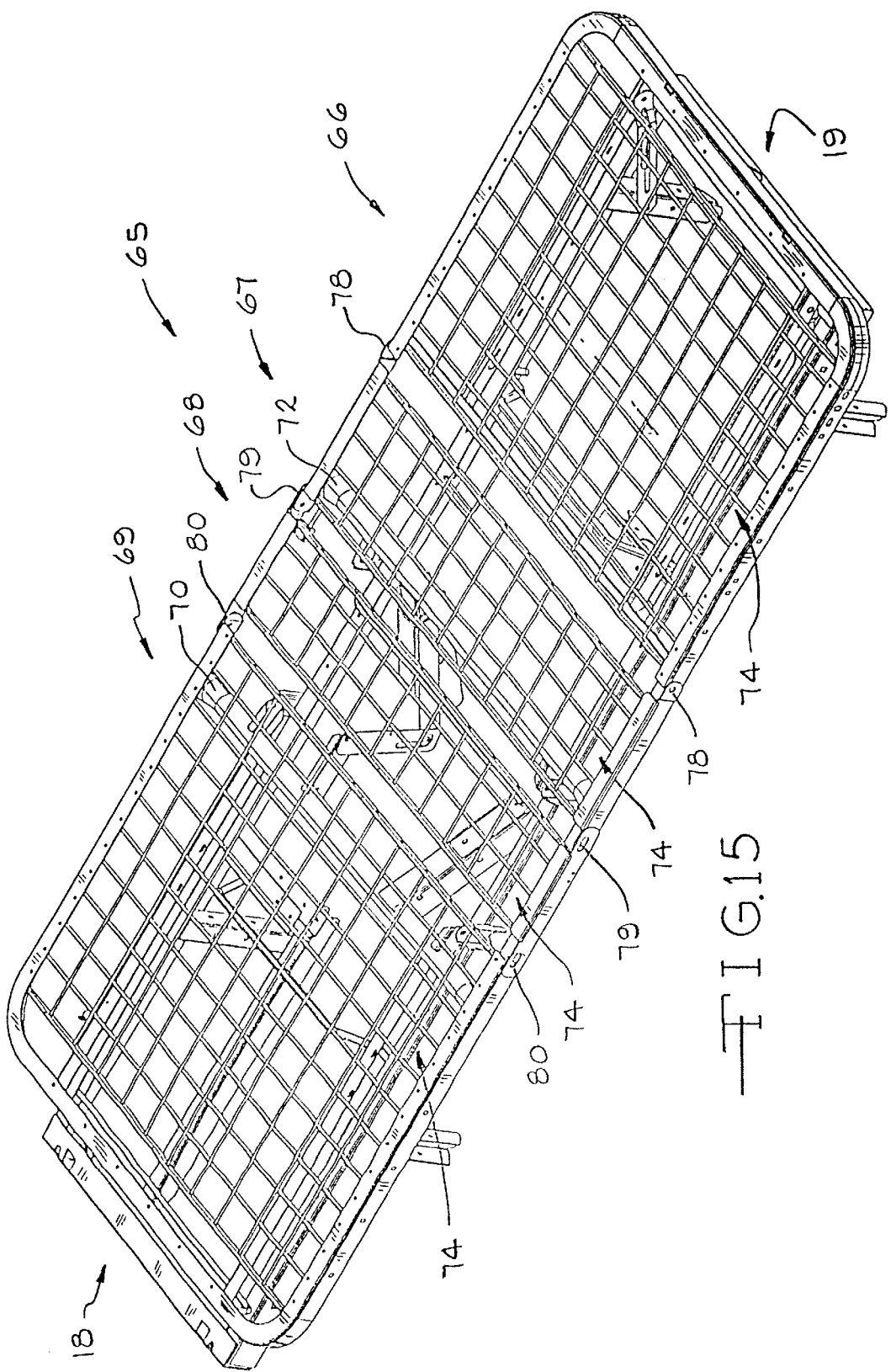
FIG. 15 is a partial perspective view of the mattress frame and a mattress support of the articulating bed.
Figure 16:
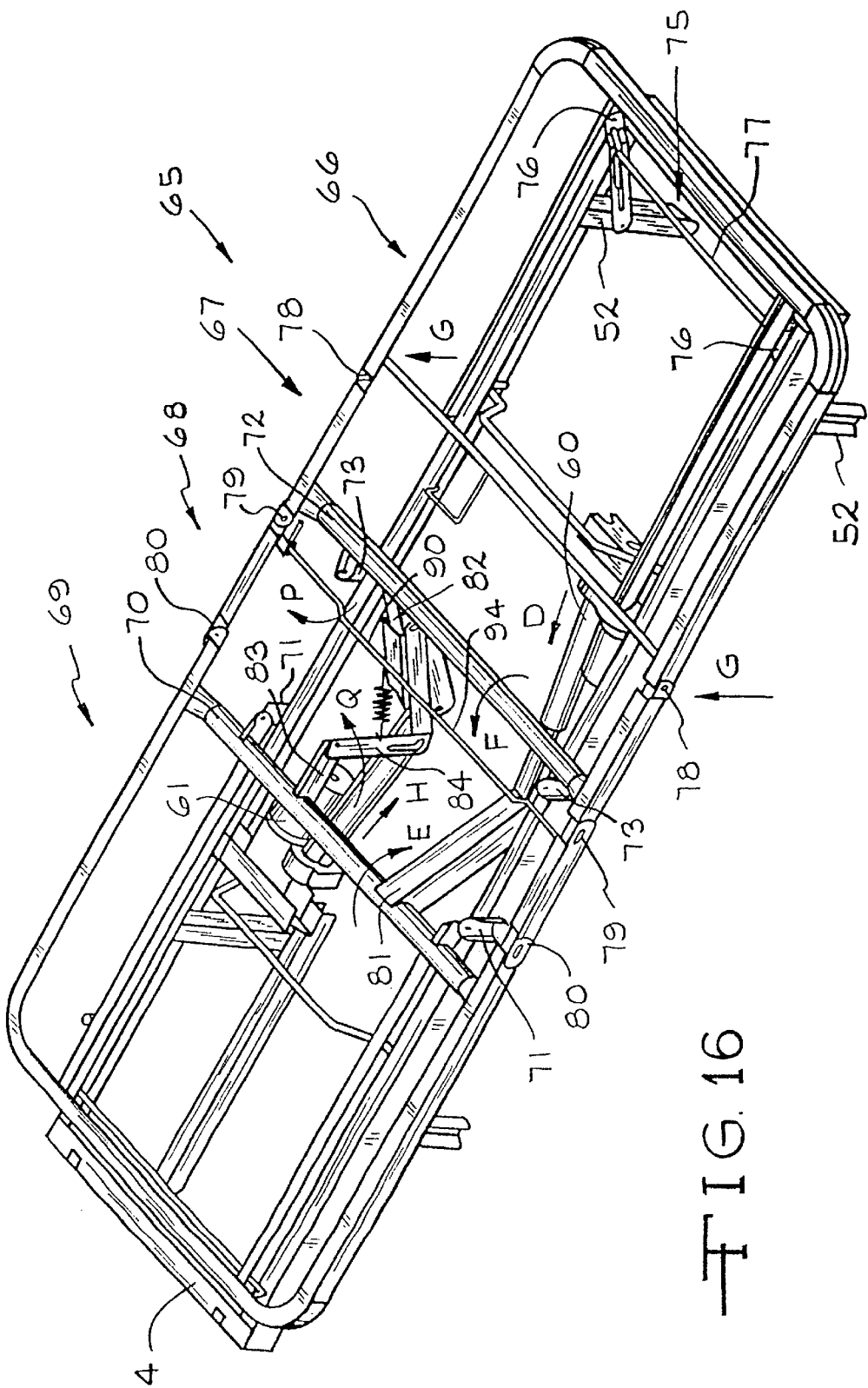
FIG. 16 is a partial perspective view of the mattress frame and the mattress support, and further showing a latch that interconnects the head and knee sections of the mattress support for simultaneous raising and lowering the head and knee sections.

With reference to FIGS. 15 and 16, a mattress support 65 includes a foot section 66, a knee section 67, a seat section 68 and a back section 69. Each section of the mattress support 65 includes a wire mesh 74 (shown in FIG. 15) over the upper surface for support of a mattress (not shown). For clarity, the wire mesh 74 is shown only in FIG. 15. The back section 69 includes a torsion tube 70, which is pivotally mounted to the extensions 71 of the mattress frame 4. Similarly, the knee section 67 includes a torsion tube 72 that is pivotally mounted to the extensions 73 of the mattress frame 4. The foot section 66 of the mattress support 65 is pivotally attached to the mattress frame 4 by a pivoting link 75. The pivoting link 75 includes a cross bar or tube 77 and a pair of arms 76, each of which is pivotally attached to the downward extension 52 of the mattress frame 4. The foot section 66 is pivotally interconnected to the knee section 67 at pivots 78. In a similar manner, the knee section 67 is pivotally interconnected to the seat section 68 at pivots 79, and the seat section 68 is pivotally interconnected to the back section 69 at pivots 80. A lever arm 81 is fixed to the torsion tube 70 of the back section 69. Upon extension of the back section actuator 60 in the direction of the arrow "D" shown in FIG. 16, the back section 69 rotates about the extensions 71 in the direction of the arrow "E". This raises or tips the back section 69 into an upward position. In a similar manner, the torsion tube 72 of the knee section 67 includes a lever arm 82 that is pivotally connected to the knee section actuator 61. Similarly, extension of the knee section actuator 61 in the direction of the arrow "H" causes the knee section 67 to pivot about the extension 73 in the direction of the arrow "F". This raises or tilts the knee section 67 such that the pivot 78 moves upwardly in the direction of the arrow "G".

Figure 18:
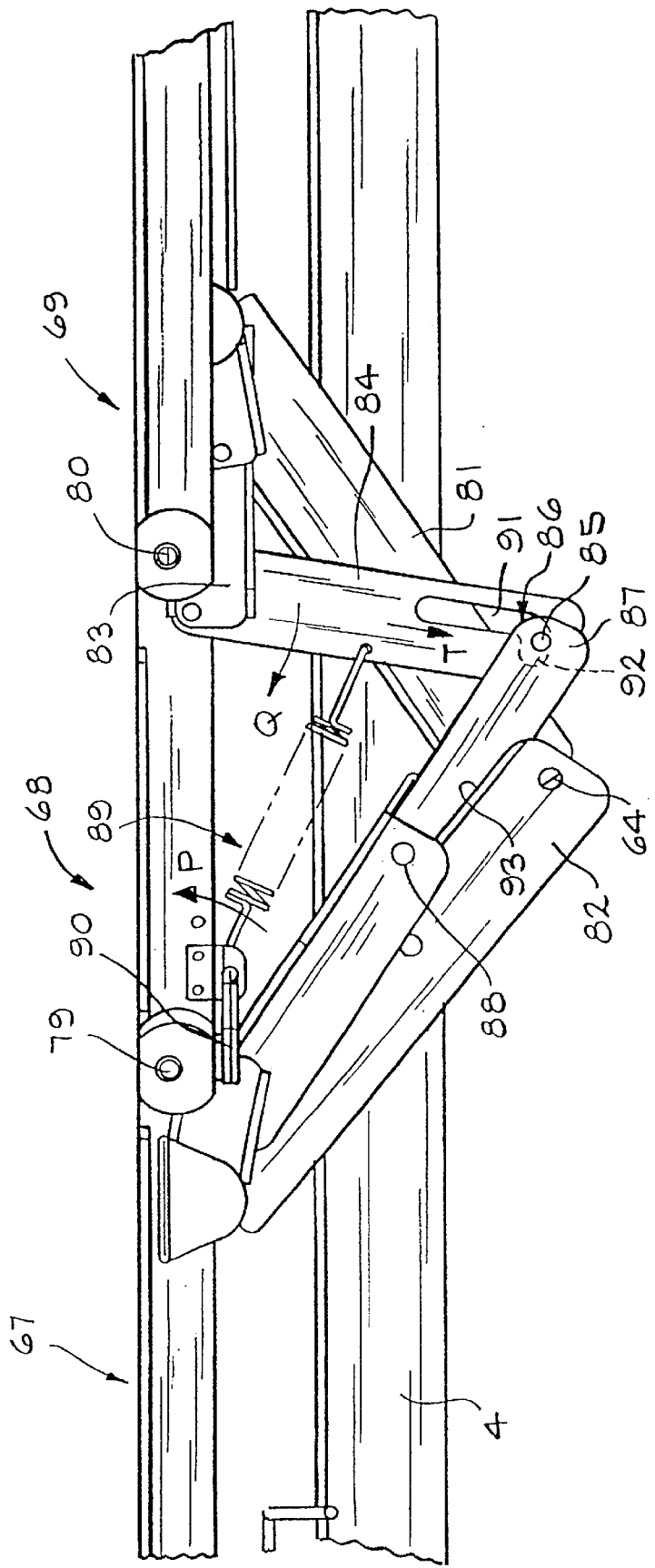
FIG. 18 is a partial side elevational view showing a latch that selectively couples the back and knee sections of the mattress support.
Figure 20:
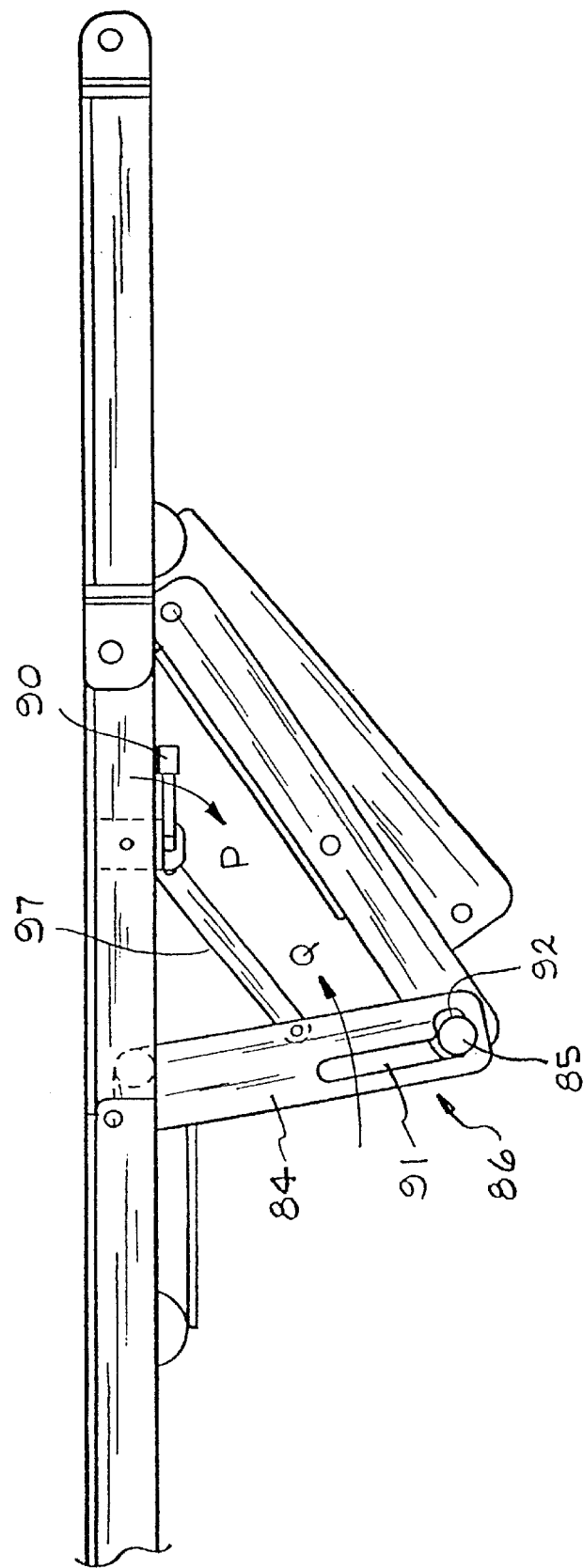
FIG. 20 is a partial side elevational view showing another alternative latch for selectively coupling the back and knee sections of the mattress support.

Continuing with reference to FIG. 16, a latch bar 84 may also be interconnected between the back and knee section 69, 67 such that extension of the back section actuator 60 in the direction of the arrow "D" causes the back section 69 and the knee section 67 to raise simultaneously. With reference also to FIG. 18, a latch arm 83 is attached to the torsion tube 70. The latch bar 84 is pivotally connected to the latch arm 83 and includes a generally J-shaped slot 86 adjacent the lower end. A pin 85 is received in the J-shaped slot 86, thereby interconnecting the latch bar 84 and a latch arm 87. The latch arm 87 has a generally U-shaped cross section, and fits over the lever arm 82. A selector bar 90 (more clearly shown in FIG. 16) includes an offset center portion 94. The selector bar 90 may be rotated in the direction of the arrow "P" to generate a tension force on a spring 89 that causes the latch bar 84 to rotate in the direction of the arrow "Q". As the latch bar 84 rotates in the direction of the arrow "Q", the pin 85 aligns with an elongated, straight portion 91 of the J-shaped slot 86. In this position the back section 69 and the knee section 67 are not interconnected, and may be raised independently. If the selector bar 90 is rotated in the direction opposite the direction of the arrow "P", releasing the tension force in the spring 89, the latch 84 will rotate in a direction opposite the direction of the arrow "Q", such that the pin 85 engages a hooked end portion 92 of the J-shaped slot 86. With the pin 85 in this position, the actuation of the back section actuator 60 will cause the back section 69 to rotate upward in the direction of the arrow "E" (shown in FIG. 16). This will drive the latch 84 downward in the direction of the arrow "T" (shown in FIG. 18). This causes a clevis pin 88 of the latch arm 87 to push downwardly on the lever arm 82. This, in turn, causes the knee section 67 to rotate in the direction of the arrow "F" (shown in FIG. 16) to raise the knee section 67 in the direction of the arrow "G". The clevis pin 88 contacts the upper surface 93 of the lever arm 82 when the latch bar 84 is in the engaged position with the pin 85 in the hooked end portion 92 of the J-shaped slot 86. It should be understood that a hard link 97 may be substituted in the place of the tension spring 89, as shown in FIG. 20. It should also be understood that a return spring 98 may be used in combination with the tension spring 89 or hard link 97, as shown in FIG. 20, to urge the latch bar 84 so as to align the pin 85 with the elongated straight portion 91 of the J-shaped slot 86.

When the back section actuator 60 is extended with the latch bar 84 in the engaged position, the clevis pin 88 of the latch extension 87 will push downwardly on the lever arm 82 rotating the torsion tube 72 in the direction of the arrow "F". Because the knee section actuator 61 has not been actuated, this would normally cause a binding action. However, as illustrated in FIGS. 9 and 10, the tube 58 of the knee section actuator 61 includes an elongated slot 59 adjacent the end of the tube 58. The pin 64 at the lower end of the lever arm 82 (shown in FIG. 18) slides along the slot 59 when the back section actuator 60 is extended and the latch bar 84 is in the engaged position. This prevents binding between the back section actuator 60 and the knee section actuator 61.

Referring back to FIGS. 15 and 16, the seat section 68 is shown to slidably and pivotally connected to the back section 69 and the knee section 67. This is accomplished by providing slots 12 at opposite ends of the seat section 68. The back section 69 and the knee section 67 may be pinned to the seat section 68 by pins (defined by pivots 79, 80) which are slidably and pivotally engageable with the slots 12 provided at the ends of the seat section 68. Alternatively, the back section 69 and the knee section 67 may be provided with slots at one end (not shown) and the seat section 68 may be provided with pins for slidably and pivotally engaging the slots.

Figure 33:
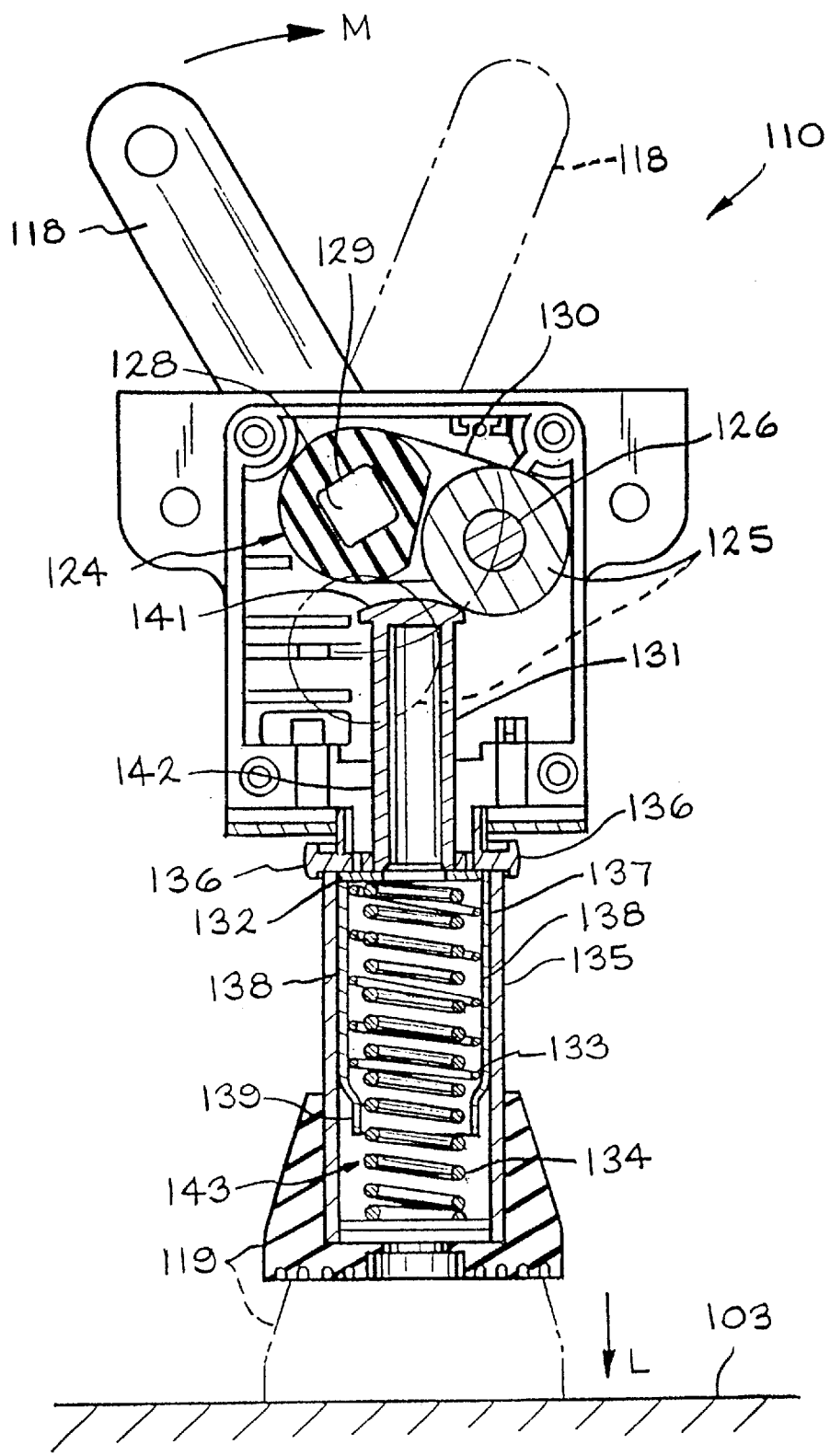
FIG. 33 is a sectional view of the brake assembly taken along the line 33—33 of FIG. 32.
Figure 34:
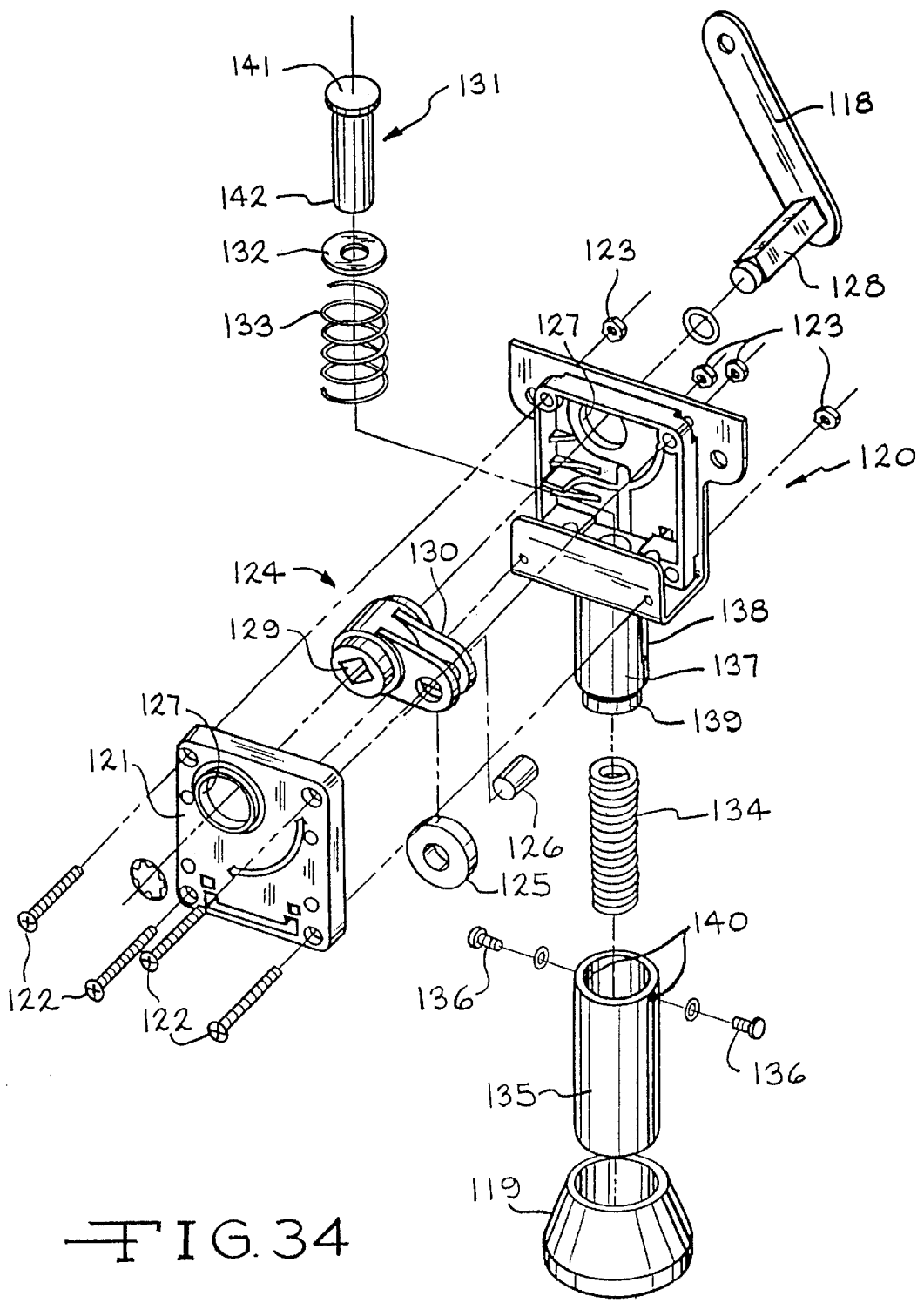
FIG. 34 is an exploded perspective view of the brake assembly for the articulating bed.

As shown in FIG. 33, the back section 69 is pivotally attached to the mattress frame 4 at a first pivotal connection (generally indicated at 71). A first end of the seat section 68 is pivotally connected to the back section 69 at a second pivotal connection (generally indicated at 80). The second pivotal connection 80 is spaced-apart from the first pivotal connection 71 so as to orbit about the first pivotal connection 71 upon moving the back section 69. Similarly, the knee section 67 is pivotally attached to the mattress frame 4 at a third pivotal connection (generally indicated at 73 in FIG. 16). A second end of the seat section 68 is pivotally connected to the knee section 68 at a fourth pivotal connection (generally indicated at 79 in FIG. 16). The third pivotal connection 73 is spaced-apart from the fourth pivotal connection 79 so as to orbit about the third pivotal connection 73 upon moving the knee section 67. As shown in phantom in FIG. 33, upon raising the back section 69, the pin 80 slides within the slot 12. This, likewise, may occur at the other end (see pivot 79) of the of the seat section 68. This results in an increase in the area of the seat section 68.

Figure 21:
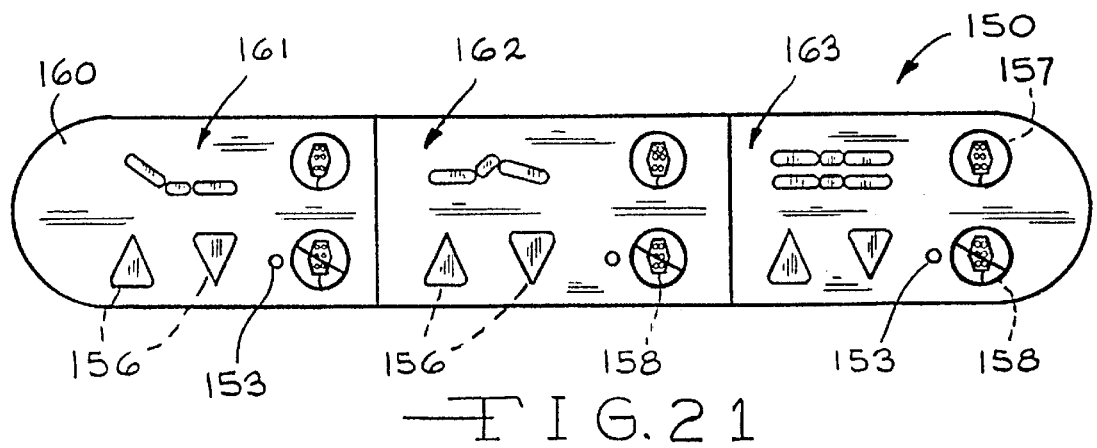
FIG. 21 a front elevational view of a staff control for controlling the operation of the actuators.
Figure 22:
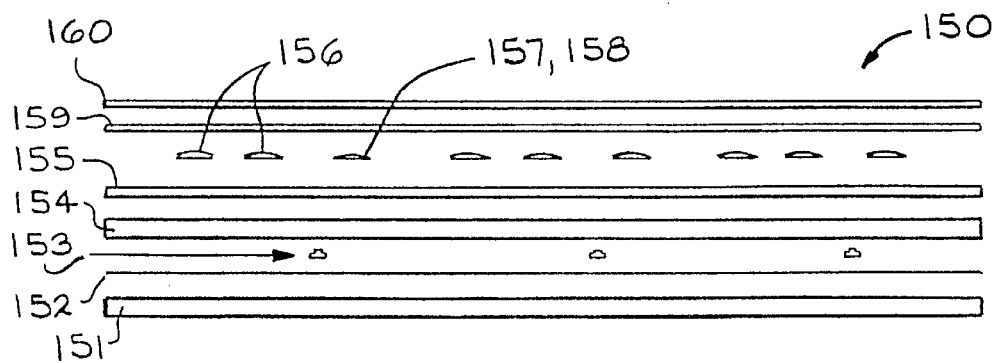
FIG. 22 a diagrammatic representation of an exploded top plan view of the staff control shown in FIG. 21.
Figure 23:
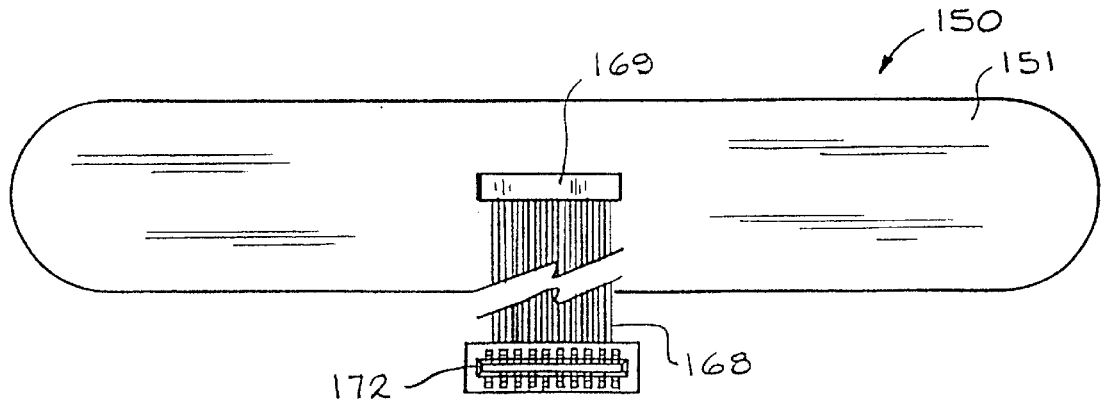
FIG. 23 a rear elevational view of the staff control shown in FIGS. 21 and 22.
Figure 26:
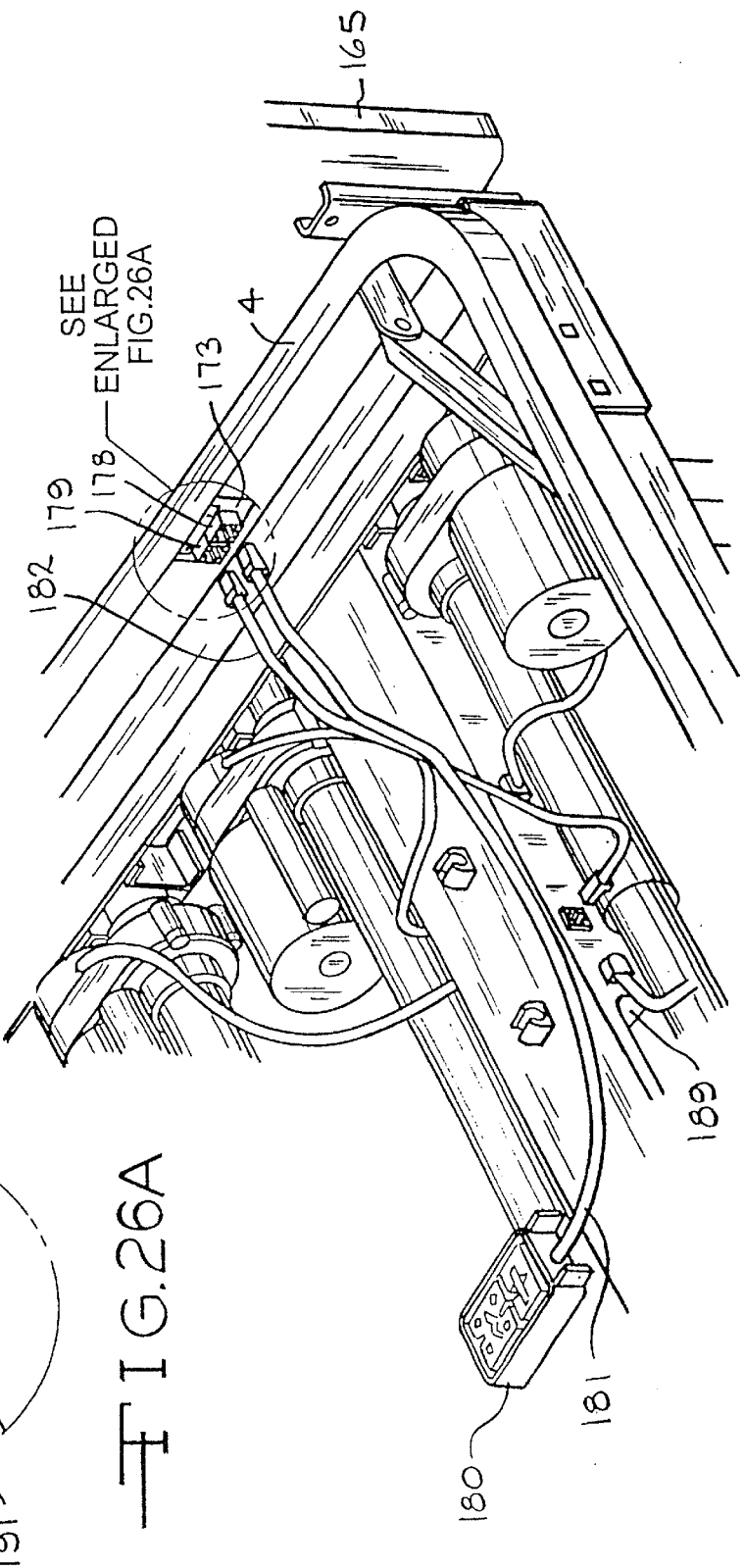
FIG. 26 is a partial perspective of the articulating bed, and further showing the footboard attached to the foot end of the bed and a pendant cord and a bypass cord connecting to the relay board to the power box and the pendant, respectively.
Figure 26A:
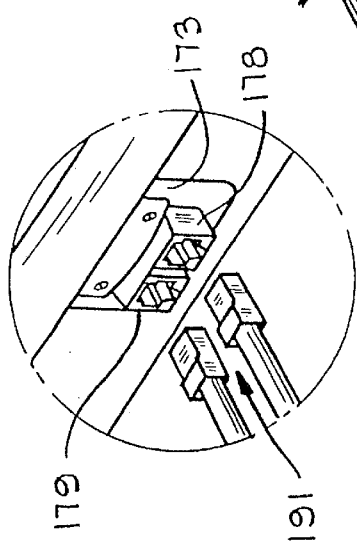

The actuators 20, 60 and 61 may be controlled by staff attendants via a control, such as the staff control 160 shown in FIGS. 21–23, or by the patient via a patient control, such as the pendant 180 shown in FIG. 26. As shown in FIG. 22, the staff control 150 comprises a back panel 151, an adhesive element 152, a plurality of visual indicators, such as the light emitting diodes (LED(s)) 153 shown, a circuit board 154, a spacer 155, a plurality of contact switches 156, 157, 158, a static shield 159, and an overlay 160. The back panel 151 is preferably fabricated from aluminum material. The circuit board 154 is attached to the pack panel 151 by the adhesive element 152. The LED(s) 153 are operatively connected to the circuit board 154. A spacer 155 is interposed between the circuit board 154 and the contact switches 156, 157, 158. The spacer 155 is preferably a co-polyester material. The contact switches 156, 157, 158 are momentary-on contact switches. It is preferable that the contact switches 156, 157, 158 be comprised of nickel plated domes which cooperate with the circuit board 152 to make the connection between at least two separate contact points in the circuit upon depressing the dome and break the connection between the contact points upon releasing the dome. The nickel plated domes provide a spring element to urge the overlay 160 away from the contact switches 156, 157, 158 upon depressing and releasing the nickel plated domes through the overlay 160. A static shield 159 is interposed between the static shield 155 and contact switches 156, 157, 158, and the overlay 160. The overlay 160 is preferably fabricated from a plastic material, such as velvet polyester.

As shown in FIG. 21, the overlay 160 carries graphic indicia in locations adjacent the contact switches 156, 157, 158. The overlay 160 shown is graphically divided into three areas. A first area 161 is dedicated to the operation of the back section actuator 61 (shown in FIGS. 9 and 10). A second area 162 is dedicated to the operation of the knee section actuator 60 (shown in FIGS. 9 and 10). A third area 163 is dedicated to the operation of the actuator 20 (shown in FIGS. 9 and 10) which raises, lowers, and tilts the mattress frame 4 relative to the base frame 3 (as illustrated in FIG. 2). Each area has two graphically represented switches that correspond to contact switches 156 that operate respective actuators 20, 60 and 61 to raise and lower the mattress frame 4, the knee section 67, and the back section 69. The staff control 150 also includes a lockout feature that prevents the patient from controlling one or more of the actuators 20, 60 and 61 via the pendant 180. This is accomplished by providing each graphically divided area with a graphically represented switch that corresponds to a contact switch 157, 158 that disables the operation of the pendant 180 with regard to that actuator 20, 60 and 61 corresponding to that area. Each area further includes a graphic representation that is illuminated by an LED 153 to provide an indication that the pendant 180 (shown in FIG. 28) is locked out from operating the actuators 20, 60 and 61 associated with a respective area 161, 162, 163.

Figure 24:
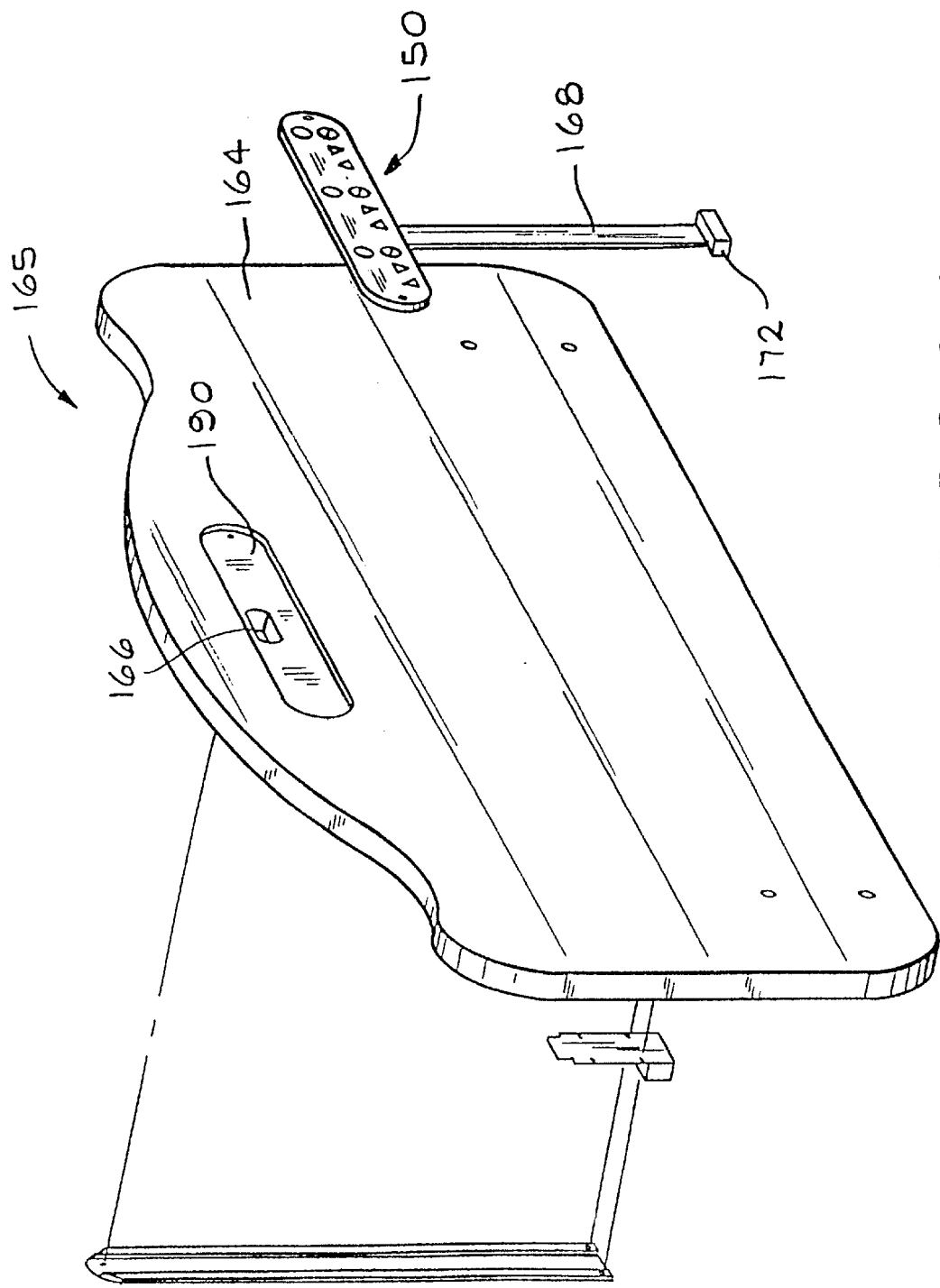
FIG. 24 an exploded front perspective view of a foot board, the staff control, a relay board, and a plastic extrusion.
Figure 25:
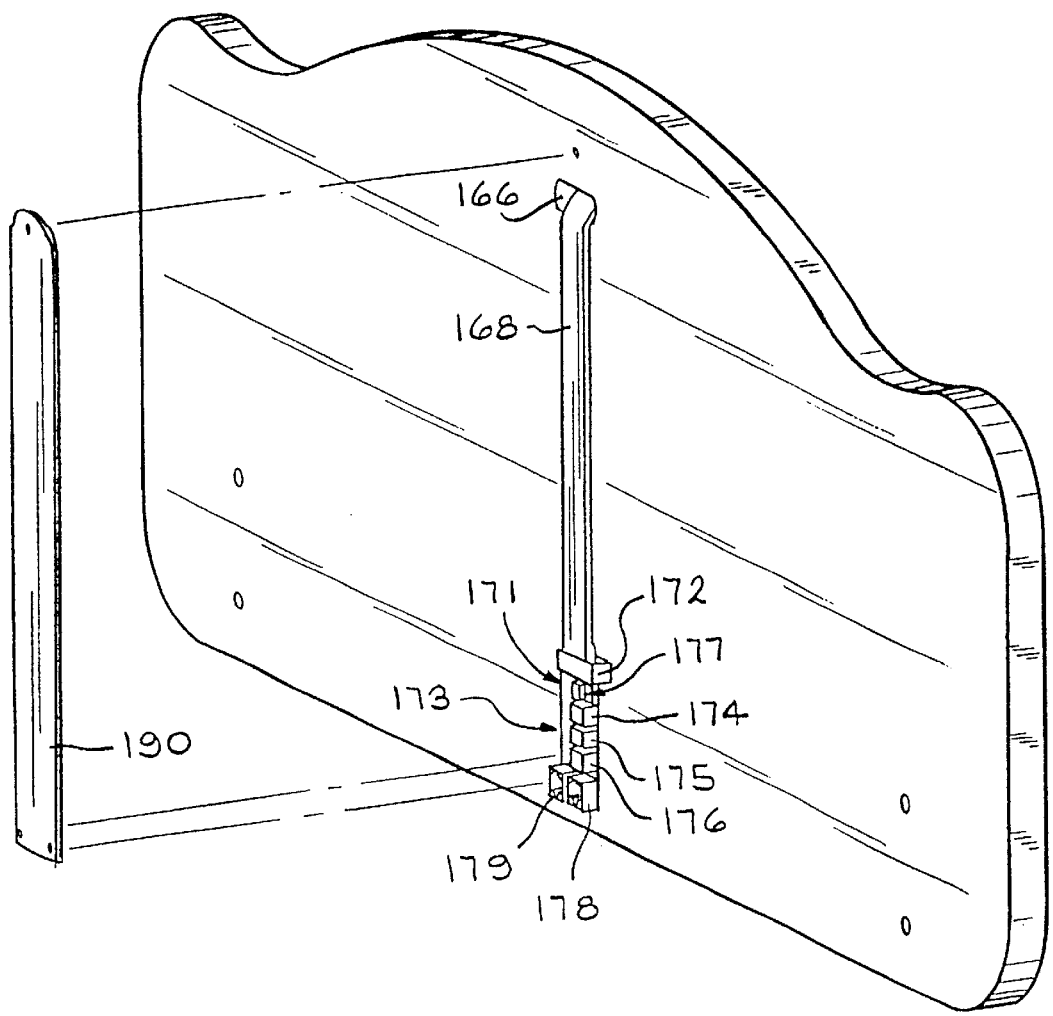
FIG. 25 a partially exploded rear perspective view of the foot board, the staff control, the relay board, and the plastic extrusion.

As illustrated in FIG. 24, the staff control 150 is mounted within a first recess 190 in an outer surface 164 of the footboard 165 so as to be substantially flush with the outer surface 164 of the footboard 165. An aperture 166 passing through footboard 165 communicates with the recess 190. The aperture 166 provides access to a first or upper female connector (not shown) supported by the circuit board 154. The first female connector is a twenty-conductor, flat wire-type, board-edge style connector, and is attached to a twenty-conductor, flat-wire type ribbon cable 168 having a male connector 169 that is matingly engageable with the first female connector. As shown in FIG. 25, the ribbon cable 168 is directed from the aperture 166 through the footboard 165 downwardly along an inner surface 170 of the footboard 165 to a second recess 171 in the inner surface 170 of the footboard 165. A second and lower female connector 172 at the lower end of the ribbon cable 168 matingly engages a relay board 173 disposed within the recess 171 in the inner surface 170 of the footboard 165. An extruded plastic sheath 190 is attached to the inner surface 170 of the footboard 165 to cover and protect the ribbon cable 168.

The relay board 173 disposed within the recess 171 in the inner surface 170 of the footboard 165 supports control devices, such as the three latching relays 174, 175 and 176 shown, a voltage regulator 177 which provides a 12 volt output for controlling the relays 174, 175 and 176, and two modular-type connectors 178, 179. The latching relays 174, 175 and 176 enable and disable operation of the actuators 20, 60 and 61 (shown in FIGS. 9 and 10) from the pendant 180 by making and breaking the circuit connection to the pendant 180 (shown in FIG. 26). As shown in FIG. 26, the modular-type connectors 178, 179 permit the relay board 173 to interface with the pendant 180 and a power box 189 mounted to the mattress frame 4. A pendant cord 181 makes the connection between the one of the connectors 178 and the pendant 180. A bypass cord 182 makes the connection between the other connector 179 and the power box 189. The bypass cord 182 is preferably keyed, generally indicated at 191, to a corresponding connector 179 to reduce the risk of improper cord connection. The footboard 165 is mounted to the footboard brackets, generally indicated 53 in FIG. 26, at the foot end 19 of the mattress frame 4 of the bed. Sufficient clearance is provided about the connectors 178, 179 to ensure that the connectors 178, 179 are unobstructed at any point during the use and operation of the bed.

Figure 27:
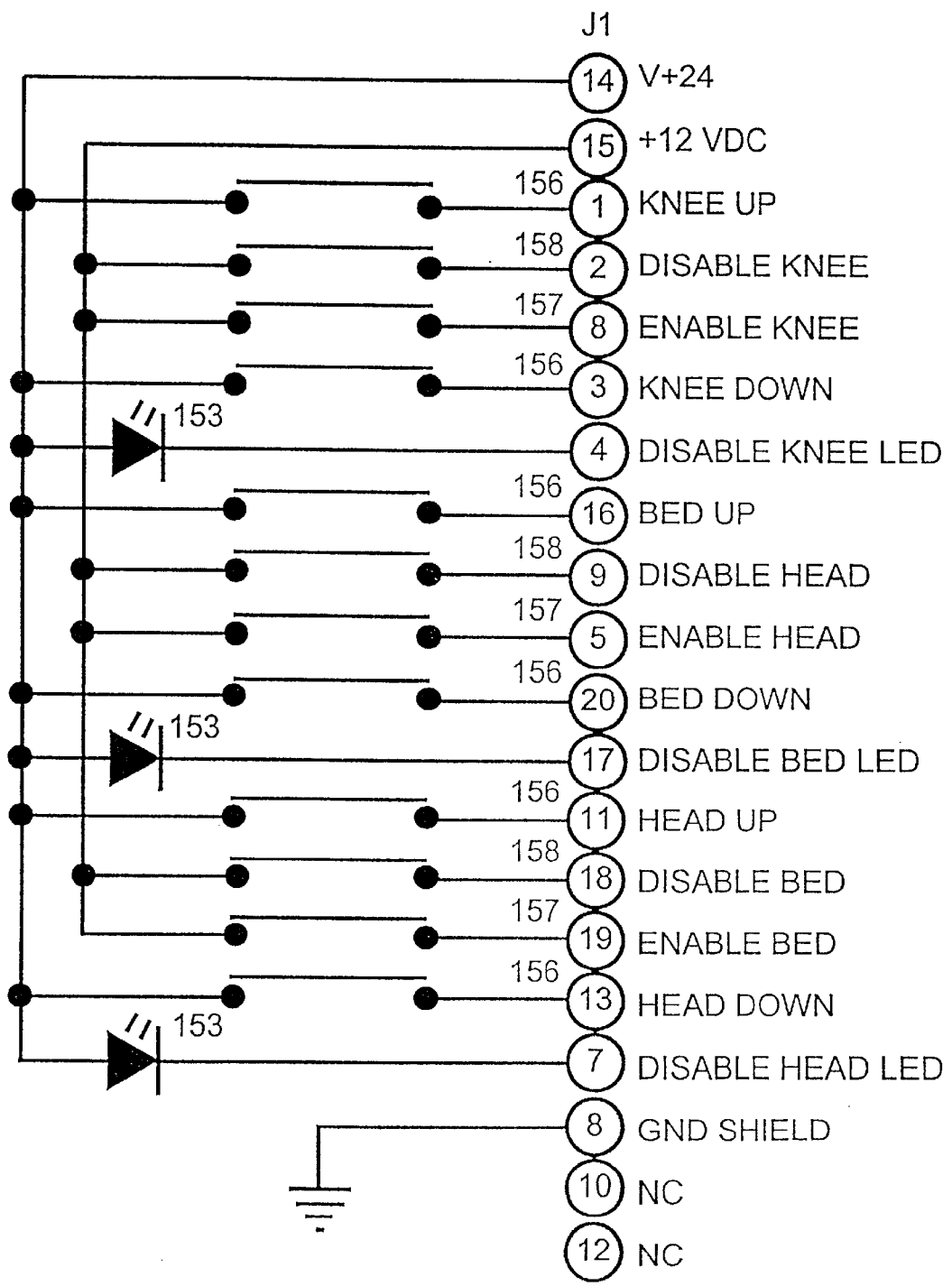
FIG. 27 is a schematic diagram of a staff control circuit.
Figure 28:
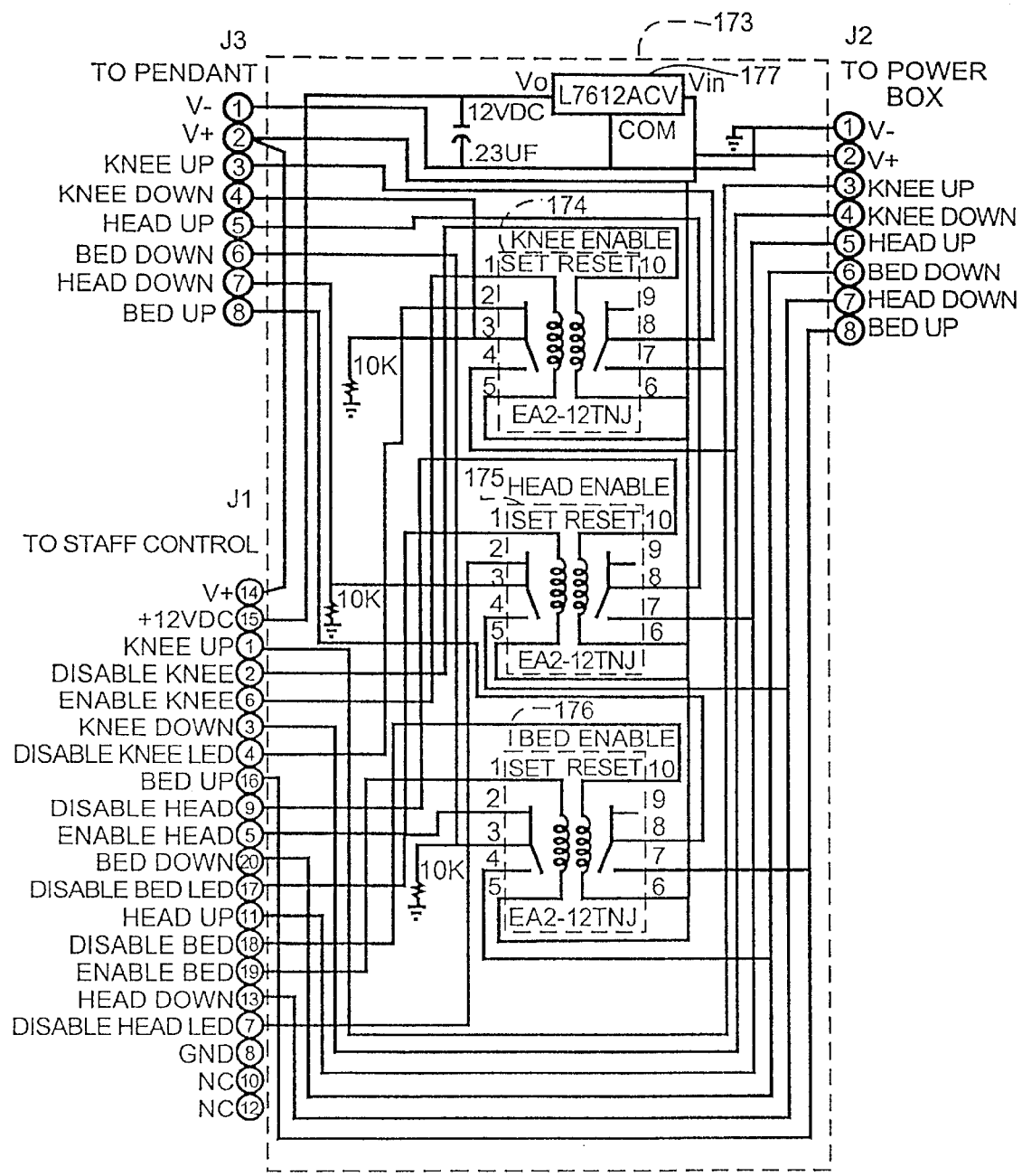
FIG. 28 is a schematic diagram of a relay board circuit.
Figure 29:
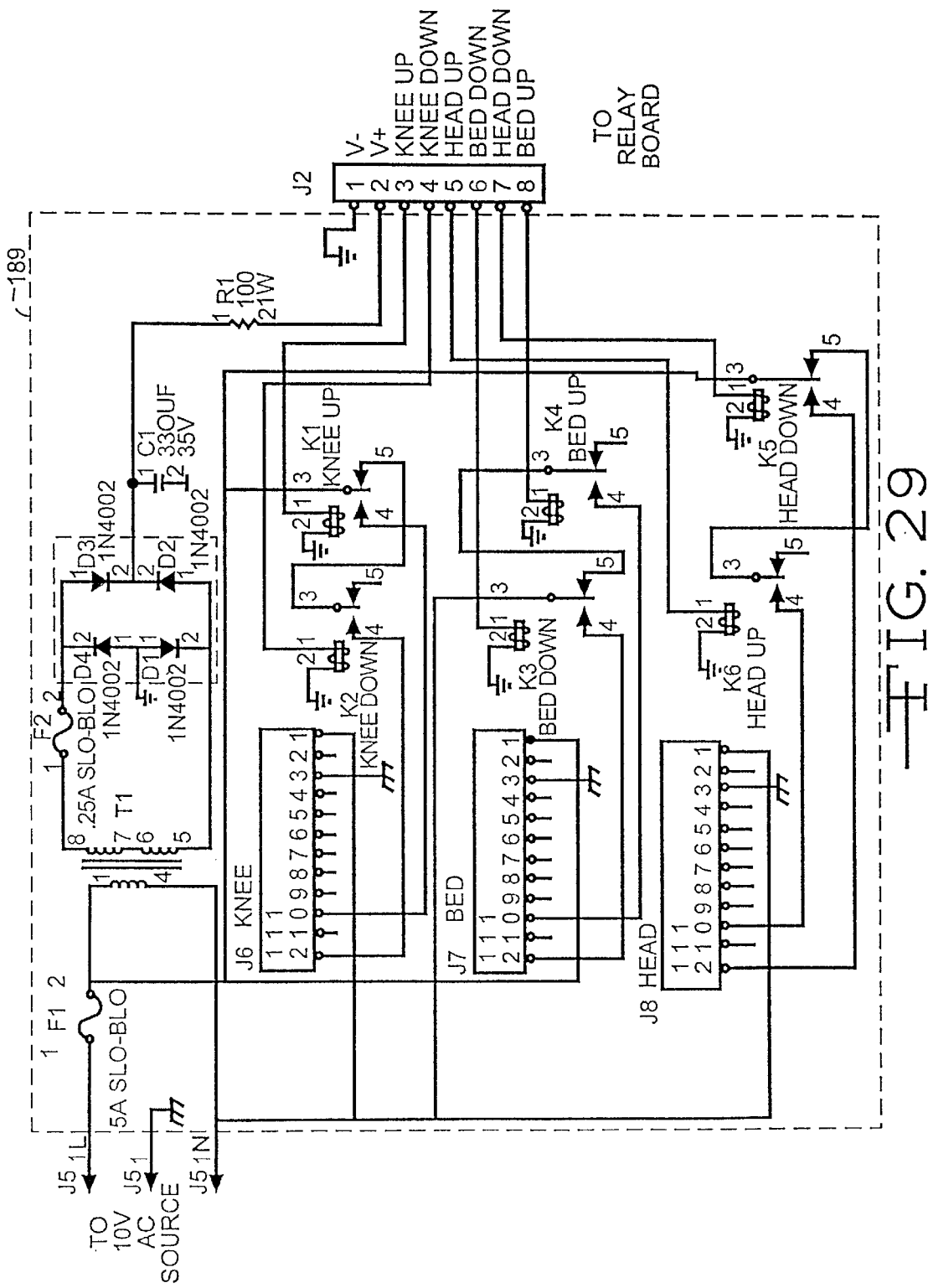
FIG. 29 is a schematic diagram of a power box circuit.

An electrical schematic for the relay board 173 is shown in FIGS. 27–29. The female connector 172 at the end of the ribbon cable 168 (shown in FIGS. 24 and 25) matingly engages a relay board 173 at junction J1. The bypass cord 182 connects to its corresponding connector 179 (shown in FIG. 26) at junction J2 and the pendant cord 181 connects to its corresponding connector 178 (also shown in FIG. 26) at junction J3. With reference to FIG. 29, the power box 189 houses a step-down transformer T1, a rectifier circuit D1–D4, and control devices, such as the six normally open relays K1–K6 shown. A 110V AC source is connected to the transformer T1 at junction J5. The transformer T1 and rectifier circuit D1–D4 set produce a 24VDC signal from 110V AC source connected at junction J5. The 24VDC signal passes from the power box 189 through the bypass cord 182 (shown in FIG. 26) to the relay board 173 across pins 1 and 2 of the connector 179 (also shown in FIG. 26) at junction J2. The 24VDC signal is further carried through the ribbon cable 168 (shown in FIGS. 24 and 25) to the staff control circuit (shown in FIG. 27) across pins 8 and 14 at junction J1 and through the pendant cord 181 (shown in FIG. 26) to the pendant circuit (not shown) across pins 1 and 2 at junction J3. With reference to FIG. 27, the 24VDC potential is present at one leg of each actuator switch 156 in the staff control circuit and further at the anode of each LED 153. The actuator switches 156 are preferably momentary normally open contact switches. Upon closing the actuator switches 156, the relay contacts K1–K6 (shown in FIG. 29) in the power box 189 are energized to close to permit power from the power source at junction J5 to drive the actuator motors at junctions J6–J8 and control or effect movement of the bed sections, namely: the mattress frame 4 and the back and knee section 67, 69. The voltage regulator 177 supported by the relay board 173 converts the 24VDC signal from the power box 189 to produce a 12VDC output for controlling the latch relays 174, 175 and 176. The 12VDC signal is carried through the ribbon cable 168 to the staff control circuit across pins 8 and 15 at junction J1. The 12VDC potential is present at one leg of each pendant enable/disable switch 157, 158. Upon closing the enable switches 157, corresponding latch relays 174, 175, 176 (shown in FIG. 28) are set to enable the pendant 180 (shown in FIG. 25) to operate the actuator motors at junction J6–J8 (shown in FIG. 28). Upon closing the disable switches 158, the corresponding latch relays 174, 175, 176 are reset to disable the pendant 180 to prevent the pendant 180 from controlling the control devices in the power box 189. That is to say, the pendant 180 is disabled to prevent the pendant 180 from energizing the relay contacts K1–K6 operating the actuator motors. Upon resetting the latch relays 174, 175, 176, the LED 153 is forward-biased to radiate light to provide a visual indication that the pendant 180 is disabled.

The staff control 150 and the relay board 173 are provided in low profile packages to permit the staff control 150 to be mounted within the relatively shallow footboard 165 at the foot end 19 of the bed. This is accomplished by producing a staff control 150 as prescribed above and further by providing a separate relay board 173 remote from the staff control 150. More particularly, the staff control 150 is provided in a low profile package because it cooperates with a relay board 173 disposed within a recess 171 in the inner surface 170 of the footboard 165.

Figure 30:
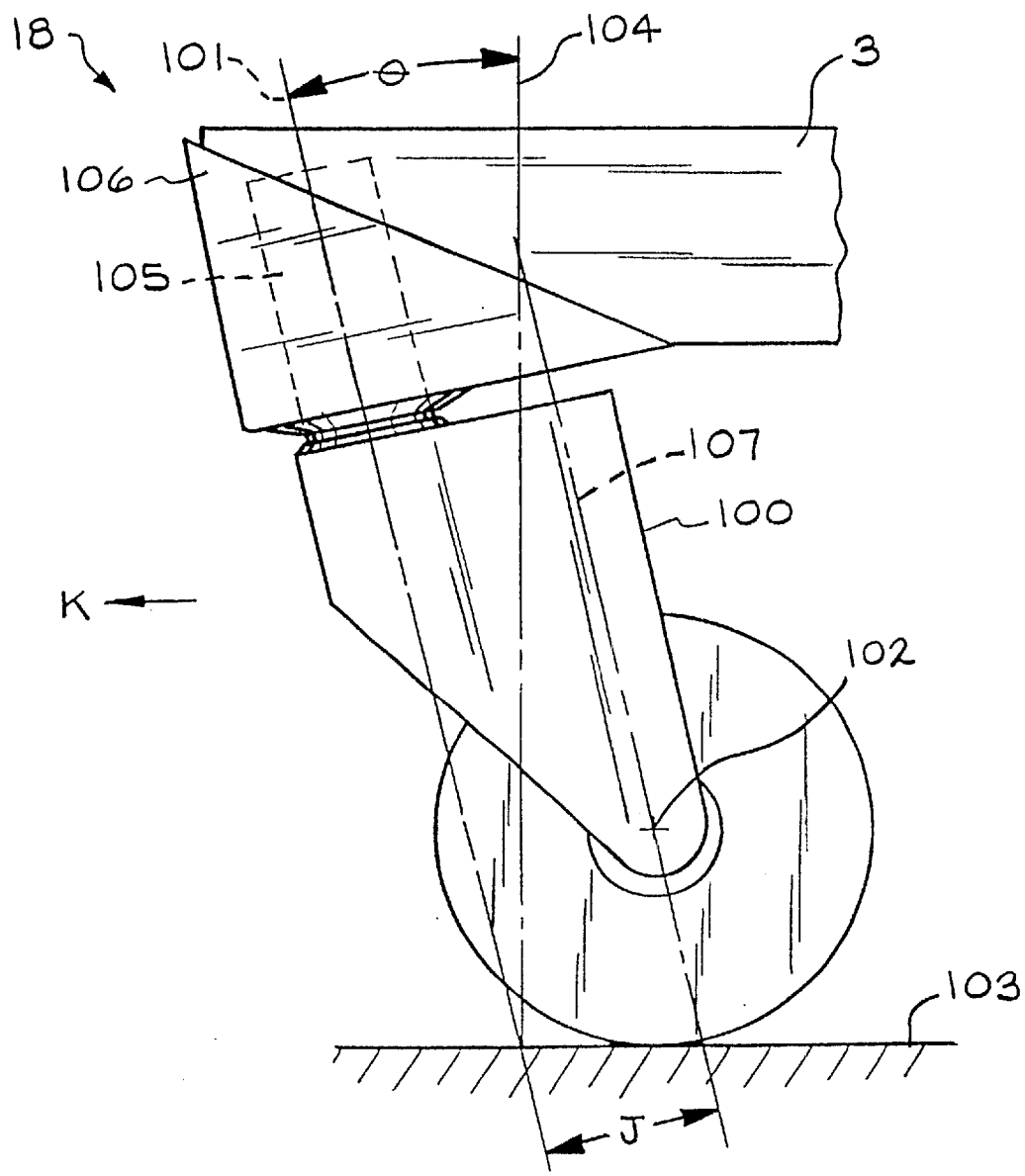
FIG. 30 is a side elevational view of a caster of the articulating bed.

Now, with reference back to FIG. 3, the bed shown includes caster wheels 100 mounted at each corner of the base frame 3. Each caster 100 includes a stem portion 105. As illustrated in FIGS. 2 and 30, each stem portion 105 defines a pivot axis 101, which is collinear with the stem portion 105. Each caster 100 shown is mounted to the base frame 3 by a bracket 106 that allows the stem 105 to be mounted at an angle relative to a vertical axis 104. Each of the caster wheels pivots about the pivot axis 101, which is angled relative to the vertical axis 104. Additionally, each caster wheel 100 rotates about a horizontal axis of rotation 102 that is perpendicular to the pivot axis 101, and extends generally parallel to a floor surface 103. The axis of rotation 102 is transversely or horizontally offset a distance "J" from the pivot axis 101. The distance J is the distance between axis 101 and an imaginary parallel axis 107 through the rotation axis 102.

The angle at which the pivot axis 101 is offset from the vertical axis can be referred to as angle theta "θ". The angle theta "θ" is preferably about 3 degrees, although angles in a range of 2 degrees to 7 degrees will also provide the desired centering action. The combination of the transverse offset "J" and the bias, or tilt angle theta "θ"0 of the pivot axis 101, causes a moment to be generated about the pivot axis 101 if the caster wheel 100 is not aligned in a certain orientation. This moment creates a self-aligning force when the bed and caster 100 are moving in the direction indicated by the arrow "K". This self-aligning force causes the caster wheel 100 to rotate about pivot axis 101 to be aligned in a trailing position as the bed is moving in the direction of arrow K. The term "aligned" means that the wheel 100 has rotated about the axis 101 so that the caster wheel 100 and the stem portion 105 are on opposite sides of the vertical axis 104. As can be seen in FIG. 30, the vertical axis 104 is positioned between the caster wheel 100 and the stem portion 105.

As illustrated in FIG. 2, the caster 100 at the head end 18 of the bed is angled inwardly, toward the foot end of the bed. This means that the axis 101 is angled forward or in the direction of the arrow K with respect to the vertical axis 104. It can be seen that the front caster wheel 100 is in an aligned position. Also, the rear caster 100 at the foot end 19 of the bed is angled inwardly, toward the head end of the bed. This means that the axis 101 for the rear caster 100 is angled rearward or in a direction opposite the direction of arrow K. It can be seen that the rear caster wheel 100 is not in an aligned position as shown in FIG. 2. The effect of mounting the stem portions of the casters 100 at the inward angles shown is that upon moving the bed in the direction K, the front caster wheel 100 at the head end 18 of the bed will pivot into a self-aligning orientation, similar to the orientation shown in FIGS. 2 and 30. The rear caster wheel 100 at the foot end 19 of the bed will be in a non-aligned position, as shown in FIG. 2. Whether the bed is moved in the direction K or in the opposite direction, one of the sets of caster wheels 100 (either at the head end 18 or at the feet end 19) will be in an aligned orientation. That is to say, either the casters 100 the head end 18 of the bed or the casters 100 at the foot end 19 of the bed will move in a direction that will generate a self-aligning action. Upon pushing the bed, a person will normally grasp the bed at either the head or foot end 18, 19 of the bed. The casters 100 at the opposite end of the bed will be in the orientation illustrated in FIG. 30 and, therefore, will produce a self-aligning action. For example, if the bed is grasped and pushed at the foot end 19 of the bed, the casters 100 at the head end 18 of the bed will produce a self-aligning action, and the caster wheels will tend to track in a straight line. The fact that the rear caster 100 at the foot end 19 is in a non-aligned orientation is not a problem because the person pushing the bed at the foot end 19 can easily control the position of the foot end.

Figure 19:
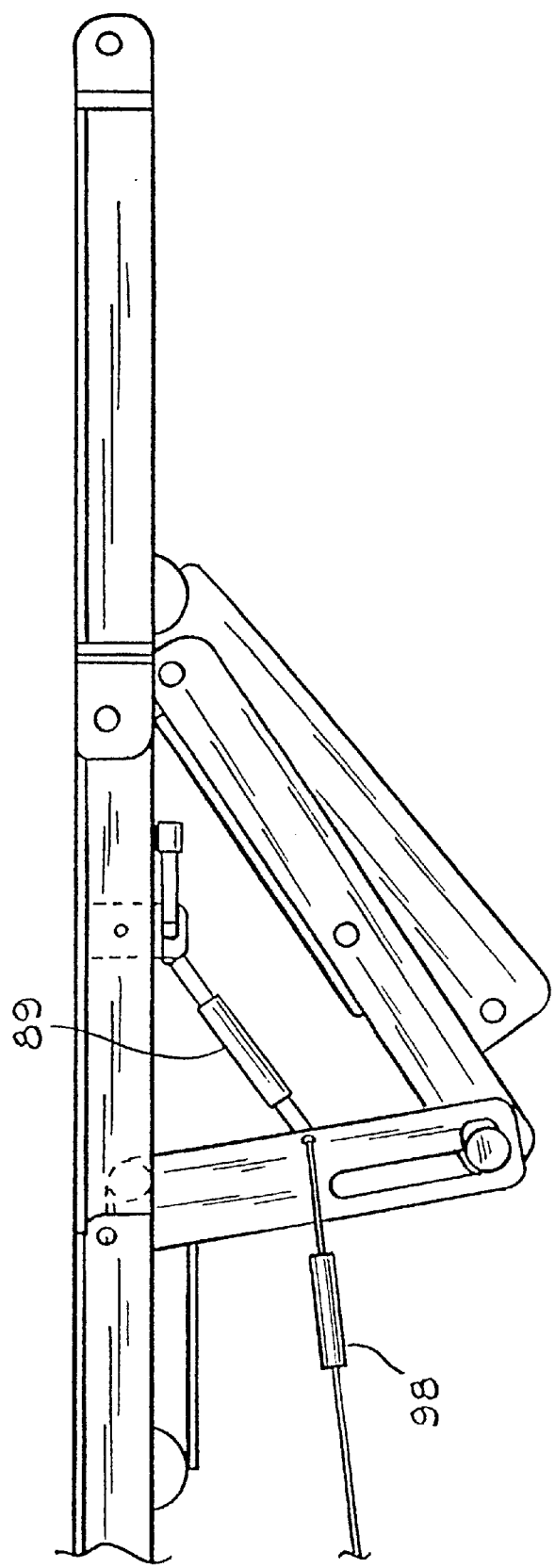
FIG. 19 is a partial side elevational view showing an alternative latch for selectively coupling the back and knee sections of the mattress support.

Again, referring back to FIG. 3, the bed shown includes a brake system including a pair of brake assemblies 110 mounted at opposite corners of the base frame 3 by nuts 111 and bolts 112. A foot pedal assembly 115 includes a pair of arms 116, and is pivotally mounted to the base frame 3 adjacent the foot end 19 of the base frame 3. The arms 116 are pivotally attached to rods 113 and 117 and pivot the lever arms 118 of the brake assembly 110. When the foot bar 115 is rotated downwardly by an operator, each foot 119 simultaneously extends downwardly in the direction of the arrow "L" (shown also in FIG. 33). With reference to FIGS. 31–34, each brake assembly 110 includes a housing 120 and a plate 121 that is fastened to the housing 120 by screws 122 and nuts 123. As clearly shown in FIG. 19, the housing 120 and plate 121 each have a bearing surface 127, which rotatably supports a cam 124. The cam 124 includes an aperture 129 having a generally square cross-sectional shape which receives the square cross-sectional shaft 128 of the lever arm 118 to provide a secure interconnection between cam 124 and the lever arm 118.

Continuing with reference to FIGS. 32 and 33, the cam 124 includes a cam lobe 130, which preferably includes a roller 125 mounted on a roller shaft 126. The housing 120 includes tubular extension 137 with a pair of vertically oriented slots 138 on opposite sides of the tubular extension 137 and a narrowed end portion 139. A brake foot 119 is preferably made of resilient rubber or other suitable material and fits on over the end of a foot tube 135. The foot tube 135 is retained on the tubular extension 137 (as shown in FIG. 33) in a telescoping manner by stop screws 136, which are threaded into the threaded apertures 140. The stop screws 136 extend inwardly into the slots 138. The foot tube 135 slides axially along the tubular extension 137. The foot tube 135 has a limited travel due to the stop screws 136 contacting either the upper or lower end of the slots 138. A plunger 131 has an upper end that forms a spherical cam follower surface 141, and a lower end 142 which abuts a washer 132 (also shown in FIG. 33). In an assembled condition, as shown in FIG. 33, the plunger 131 is guided axially in the housing 120, and is biased upwardly by the return spring 133 such that the spherical cam follower surface 141 maintains contact with the roller 125 of the cam lobe 130. The lower end of the return spring 133 abuts the narrowed end portion 139 of the tubular extension 137, and the upper end of the return spring 133 abuts the washer 132. The brake spring 134 has a smaller diameter than the return spring 133, and extends downwardly through an opening 143 at the bottom of the tubular extension 137, abutting the brake foot 119. The upper end of the brake spring 134 abuts the washer 132.

Continuing with reference to FIG. 33, rotation of the lever arm 118 in the direction of the arrow "M" causes the cam lobe 130 to push downwardly on the plunger 131. The downward force of the cam lobe 130 overcomes the upward force generated by the return spring 133 to move the brake foot 119 downwardly in the direction of the arrow "L". When the brake foot 119 reaches the floor surface 103, the brake spring 134 is compressed, thereby generating a brake force on the brake foot 119 that retains the bed at a desired location. When the lever arm 118 is rotated to the position shown in phantom in FIG. 17, the roller 125 rolls over the peak of the spherical cam follower surface 141. This generates a force that holds the lever arm 118 in the fully engaged position with the brake foot 119 against the floor surface 103 such that the brake will remain engaged after the user releases his or her foot from the foot bar 115. Because the brake foot 119 moves in an axial up and down motion, with no horizontal movement, the bed is not moved during the engagement of the brake. In addition, the brake spring 134 allows the brake to generate a relatively constant brake force regardless of variations in the height of the floor surface 103. In addition, the spherical cam follower surface 141 provides a detent-type function, and holds the lever arm 118 in the engaged position, yet is easily disengaged when the foot bar 115 is rotated upwardly.

Referring back to FIG. 1, a foot section guard 145 and a back section guard 146 are shown attached to the bed to reduce the risk of a patient rolling sideways from the bed. The guards 145 and 146 are each mounted on a pair pivot arms 147 that are attached to a sliding mounting bracket 148. The guards 145 and 146 slid inwardly or outwardly along the shafts 149 in the direction of the arrow "R". In the outward position, the guards may be rotated upwardly in the direction of the arrow "S", or rotated downwardly in a direction opposite of the arrow "S". In a lower position the guards 145 and 146 may be moved inwardly in a direction opposite of the arrow "R" for storage.

The operation of raising and lowering the mattress frame 4 is explained with reference to FIG. 1. The mattress support 65 may be raised or lowered in a horizontal position, or rotating the crank 34 to select the desired tilt mode may tilt the mattress support 65. In addition, the mattress support 65 may be adjusted by raising or lowering the knee section 67 or the back section 69, regardless of whether the mattress frame 4 is in the upward, lowered or tilted position. To raise and lower the mattress frame 4, the selector lever 34 is placed in the neutral or center position, such that the lock members 22 do not engage the lever stop 41 (clearly shown in FIG. 11). The first actuator 20 is then extended to cause the drag link assembly 10 to transmit a force to the lever members 5 to cause the lever member 5 to rotate in the direction of the arrow "B" (shown in FIG. 13). This raises the mattress frame 4, as shown in phantom lines in FIG. 2. The mattress frame 4 may be lowered in a similar manner by retraction the actuator 20, thereby rotating the lever members 5 in a direction opposite the direction of the arrow "B".

To tilt the mattress frame 4, the mattress frame 4 is placed in the upper position. The crank 34 is then rotated clockwise or counterclockwise to engage the lock member 22 with the lever stop 41 at the desired end of the bed. For example, to tilt the head end 18 of the mattress frame 4 downward, the mattress frame 4 is first raised to the upward position, as shown in FIG. 2. The crank 34 is rotated in a clockwise direction to engage the lock member 22 with the lever stop 41 adjacent the foot end 19 of the mattress frame 4, as illustrated in FIG. 12. The actuator 20 is then retracted, and the lever members 5 begin to rotate in a direction opposite the direction of the arrow "B" shown in FIG. 13, thereby lowering the mattress frame 4. When the lever stop 41 adjacent the foot end 19 of the bed contacts the lock member 22, the lever member 5 adjacent the foot end 19 of the bed will stop rotating, thereby maintaining the foot end 19 of the mattress frame 4 at substantially the upper position. The lever member 5 adjacent the head end 18 of the mattress frame 4 will continue to rotate in a direction opposite the direction of the arrow "B", thereby lowering the head end 18 of the mattress frame 4. After the lever stop 41 contacts the lock member 22, the tube 44 will retract into the telescoping end portion 11 of the drag link assembly 10, with the pin 42 sliding along the slot 43. To tilt the foot end 19 of the bed downwardly, the crank 34 is rotated in a counterclockwise direction, thereby causing the lock member 22 to stop rotation of the lever member 5 adjacent the head end 18 of the mattress frame 4. Retraction of the actuator 20 will cause the foot end 19 of the mattress frame 4 to lower in a manner similar to that described above.

Referring now to FIG. 16, operation of the foot, knee, seat and back sections 66, 67, 68 and 69 of the mattress support 65 is accomplished by actuating either the back section actuator 60, or the knee section actuator 61. Extension of the back section actuator 60 will pivot the back section 69 upwardly about the extension 71. Similarly, retracting the back section actuator 60 will pivot the back section 69 downwardly about the extension 71. Extension of the knee section actuator 61 will cause the knee section 67 to rotate about the extensions 73, thereby raising the pivots 78 in a direction indicated by the arrow "G". In addition, the knee and back sections 67, 69 may be raised or lowered simultaneously by pivoting the selector bar 90. By rotating the selector bar 90 in a first direction (i.e., in the direction of the arrow "P"), a tension force is generated in the spring 89. This causes the latch 84 to rotate so as to align the pin 85 with the elongated straight portion 91 of the J-shaped slot 86 in the latch 84. In this position, actuation of the back section actuator 60 will cause the back section 69 to rotate upwardly, and the latch 84 will slide downward, with the pin 85 sliding upward in the elongated portion 91, such that the knee section 67 does not move. If the selector bar 90 is rotated in second direction opposite to the first direction, tension on the spring 89 will be released. This permits the latch 84 to rotate to allow the pin 85 to engage the hooked end portion 92 of the J-shaped slot 86 in the latch 84 (clearly shown in FIG. 17). When the latch 84 is in the engaged position, actuation of the back section actuator 60 will cause the torsion tube 70 to rotate, thereby pushing the latch 84 downward in the direction of the arrow "T" (also shown in FIG. 17), and rotating the knee section 67 simultaneously upward.

Figure 3:
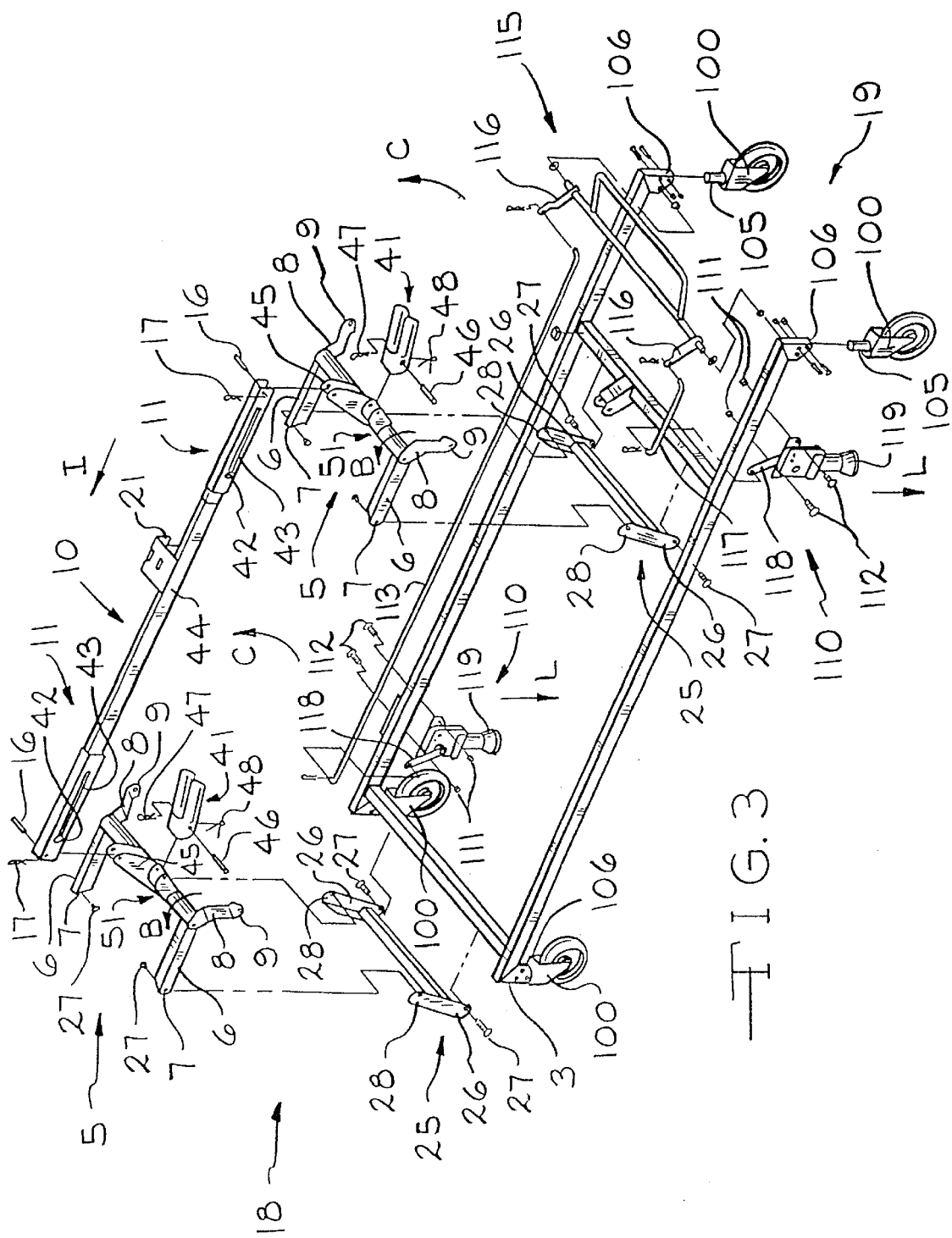
FIG. 3 is an exploded perspective view of a base frame of the articulating bed, and further showing a linkage assembly that raises, lowers and tilts the mattress frame.
Figure 17:
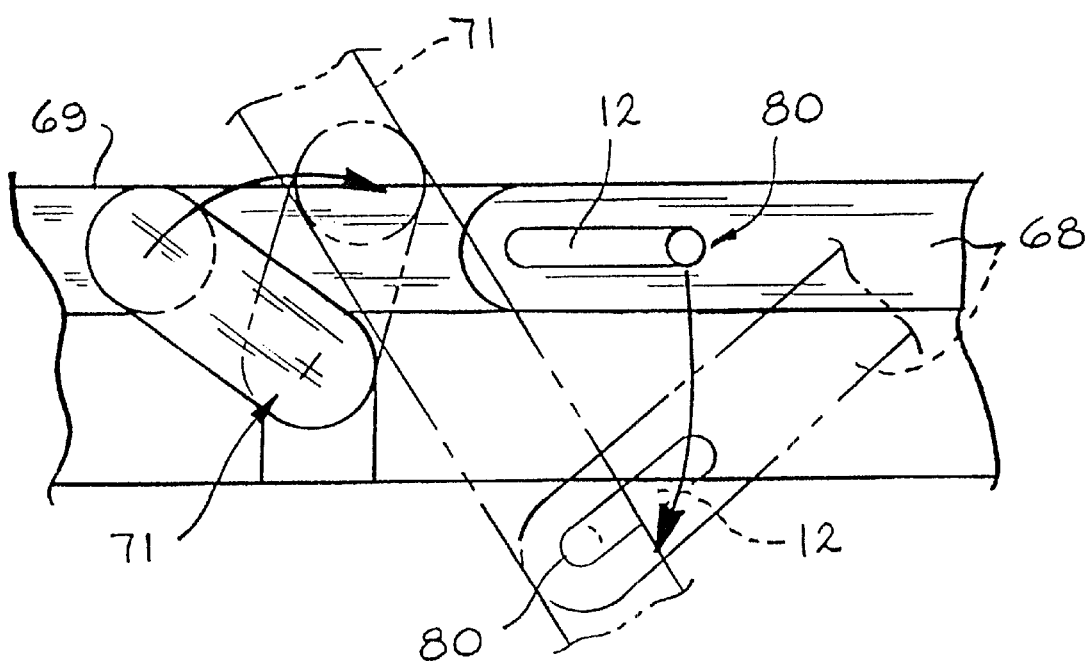
FIG. 17 is an enlarged diagrammatic representation of a slidable connection between the back section and the seat section.

Lastly, with reference to FIGS. 3 and 17, to operate the brake system, a user pushes downward on the foot bar 115, causing the arms 116 to rotate. The rods 113 and 117 rotate the lever arms 118 of the brake assembly 110. This urges the plunger 131 downwardly, overcoming the force of the return spring 133. When the foot 119 makes contact with the floor surface 103, the brake spring 134 is compressed thereby generating a relatively constant braking force regardless of irregularities in the floor surface 103. When the lever arm 118 is rotated to the fully engaged position, the roller 125 passes over the peak of the spherical cam follower surface 141, and is thereby retained in the fully extended position. Disengagement of the brakes is accomplished by rotating the foot bar 115 upwardly such that the roller 125 passes over the peak of the spherical cam follower surface 141, and the return spring 133 retains the plunger 131, and foot 119 in the upward, retracted position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A linkage for an articulating bed including a mattress frame, a back section, a knee section, and an actuator for effecting movement of said back section, said linkage comprising:

a first latch arm extending from the knee section; and a latch bar connected between said first latch arm and the back section, said latch bar being displaceable between a first position and a second position, said latch arm being engageable with said latch bar when said latch bar is in the first position to maintain movement of the back section independent relative to the knee section, said latch arm being engageable with said latch bar when said latch bar is in the second position to interconnect the back section and the knee section.

2. A linkage according to claim 1, wherein said latch bar has an upper end pivotally connected to said back section and a lower end having a J-shaped slot, said J-shaped slot having a straight portion and a hooked end portion, and said first latch arm has an upper end pivotally connected to said knee section and a lower end slidably and pivotally engageable with said J-shaped slot, said latch arm being engageable with said straight portion of said J-shaped slot when said latch bar is in said first position to maintain movement of the back section independent from the knee section, said latch arm being engageable with said hooked end portion of said J-shaped slot when said latch bar is in said second position to interconnect the back section and the knee section.

3. A linkage according to claim 2, further including a second latch arm extending from the back section and being substantially coplanar with said back section, said latch bar being pivotally connected to the back section by said second latch arm and extending downward from said second latch arm.

4. A linkage according to claim 3, further including a selector bar pivotally supported by said mattress frame and coupled to said latch bar by a link, said selector bar being displaceable to move said latch bar between the first position and the second position.

5. A linkage according to claim 4, wherein said link is a spring having a first end pivotally connected to said selector rod and a second end pivotally connected to said latch bar.

6. A linkage according to claim 5, further including a return spring connected between said latch bar and the mattress frame for urging said latch bar towards the second position.

7. A linkage according to claim 4, wherein said link is a hard link having a first end pivotally connected to said selector rod and a second end pivotally connected to said latch bar.

8. A linkage according to claim 7, further including a return spring connected between said latch bar and the mattress frame for urging said latch bar towards the second position.

9. An articulating bed comprising:

a mattress frame;

a mattress support comprising a back section and a knee section, said back section and said knee section each including a torsion tube pivotally supported by said mattress support and a lever arm extending from said torsion tube;

an actuator extending between said mattress frame and said back section lever arm for effecting movement of said back section; and a linkage comprising:

a first latch arm having an upper end connected to said knee section proximate said knee section torsion tube; and a second latch arm extending from said back section torsion tube; and a downwardly extending latch bar having an upper end pivotally connected to said second latch arm and a lower end slidably and pivotally connected to said first latch arm, said latch bar being displaceable between a first position and a second position, said first latch arm being engageable with said latch bar when said latch bar is in the first position to maintain movement of said back section independent relative to said knee section, said first latch arm being engageable with said latch bar when said latch bar is in the second position to interconnect said back section and said knee section.

10. A linkage according to claim 9, wherein said lower end of said latch bar has a J-shaped slot, said J-shaped slot having a straight portion and a hooked end portion, said upper end being pivotally connected to said knee section and a lower end slidably and pivotally engageable with said J-shaped slot, said latch arm being engageable with said straight portion of said J-shaped slot when said latch bar is in said first position to maintain movement of the back section independent from the knee section, said latch arm being engageable with said hooked end portion of said J-shaped slot when said latch bar is in said second position to interconnect the back section and the knee section.

11. A linkage according to claim 10, wherein said second latch is substantially coplanar with said back section.

12. A linkage according to claim 10, further including a selector bar pivotally supported by said mattress frame and coupled to said latch bar by a link, said selector bar being displaceable to move said latch bar between the first position and the second position.

13. A linkage according to claim 12, wherein said link is a spring having a first end pivotally connected to said selector rod and a second end pivotally connected to said latch bar.

14. A linkage according to claim 13, further including a return spring connected between said latch bar and the mattress frame for urging said latch bar towards the second position.

15. A linkage according to claim 12, wherein said link is a hard link having a first end pivotally connected to said selector rod and a second end pivotally connected to said latch bar.

16. A linkage according to claim 15, further including a return spring connected between said latch bar and the mattress frame for urging said latch bar towards the second position.

* * * * *

UNITED STATES PATENT AND TRADEMARK OFFICE
CERTIFICATE OF CORRECTION

PATENT NO. : 6,363,556 B1
DATED : April 2, 2002
INVENTOR(S) : Bernard J. Krauska and John L. Edgerton, Jr.

It is certified that error appears in the above-identified patent and that said Letters Patent is hereby corrected as shown below:

<u>Title page,</u>
Item [63], Related U.S. Application Data, insert the following:

-- [63] Continuation of application No. PCT/US/14311, filed on Jul. 9, 1998.

Signed and Sealed this

Fifth Day of November, 2002

Attest:

Attesting Officer

JAMES E. ROGAN
*Director of the United States Patent and Trademark Office*